(12) United States Patent
Leonelli et al.

(10) Patent No.: US 11,087,249 B2
(45) Date of Patent: Aug. 10, 2021

(54) METHOD AND APPARATUS FOR TRIGGERING EXECUTION OF A WORKFLOW OVER A NETWORK

(71) Applicant: Ciambella Ltd., Tortola (VG)

(72) Inventors: Jean-Baptiste Leonelli, Levallois (FR); Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 982 days.

(21) Appl. No.: 15/163,280

(22) Filed: May 24, 2016

(65) Prior Publication Data

US 2017/0344921 A1 Nov. 30, 2017

(51) Int. Cl.
*G06Q 10/06* (2012.01)
*H04L 29/08* (2006.01)
*H04W 4/50* (2018.01)

(52) U.S. Cl.
CPC ........ *G06Q 10/06311* (2013.01); *H04L 67/34* (2013.01); *H04W 4/50* (2018.02)

(58) Field of Classification Search
CPC ...... G06Q 10/06311; H04W 4/50; G06F 9/50; H04L 67/34
USPC ........................................................ 709/223
See application file for complete search history.

(56) References Cited

U.S. PATENT DOCUMENTS

| | | |
|---|---|---|
| 6,065,053 A | 5/2000 | Saeki |
| 6,108,715 A | 8/2000 | Leach et al. |
| 6,158,031 A | 12/2000 | Mack et al. |
| 6,895,573 B2 | 5/2005 | Norgaard et al. |
| 7,086,014 B1 | 8/2006 | Bartz et al. |
| 7,246,319 B2 | 7/2007 | Alden et al. |

(Continued)

FOREIGN PATENT DOCUMENTS

| | | |
|---|---|---|
| CN | 1821964 A | 8/2006 |
| CN | 201017215 Y | 2/2008 |

(Continued)

OTHER PUBLICATIONS

Feipeng Liu, "Android Native development Kit Cookbook", Mar. 1, 2013, XP055326992, ISBN: 978-1-84969-150-5, retrieved on Dec. 7, 2016 from: http://file.allitebooks.com/20150520/Android%20Native%20Development%20Kit%20Cookbook.pdt, pp. 1-331.

(Continued)

*Primary Examiner* — James E Springer
(74) *Attorney, Agent, or Firm* — Moser Taboada

(57) ABSTRACT

A method for triggering execution of a workflow over a network comprises receiving an instruction to execute a workflow comprising a first task for being executed on a first remote device, receiving network settings from the user device to enable communication and execution of the first task on the first remote device, applying the network settings to at least one of the host or the first remote device, and executing the first task on the first remote device using the network settings upon receiving the instructions from the user device. The workflow comprises multiple tasks for execution on multiple remote devices. Multiple tasks include the first task, and multiple remote devices include the first remote device. Network settings include settings for establishing communication between any two or more of the host and the remote devices.

20 Claims, 9 Drawing Sheets

(56) References Cited

U.S. PATENT DOCUMENTS

| | | | |
|---|---|---|---|
| 8,055,386 | B2 | 11/2011 | McCoy et al. |
| 8,086,744 | B2 | 12/2011 | Abdullah et al. |
| 8,352,903 | B1 | 1/2013 | Friedman |
| 8,990,787 | B2 | 3/2015 | Balassanian |
| 2002/0194313 | A1 | 12/2002 | Brannock |
| 2003/0061274 | A1 | 3/2003 | Lo |
| 2003/0120707 | A1 | 6/2003 | Bogdan et al. |
| 2003/0177208 | A1 | 9/2003 | Harvey, IV |
| 2003/0204560 | A1 | 10/2003 | Chen et al. |
| 2004/0010734 | A1 | 1/2004 | Ghercioiu et al. |
| 2004/0193635 | A1 | 9/2004 | Hsu et al. |
| 2004/0221238 | A1 | 11/2004 | Cifra et al. |
| 2004/0249944 | A1 | 12/2004 | Hosking et al. |
| 2005/0114644 | A1 | 5/2005 | Chu et al. |
| 2005/0114854 | A1 | 5/2005 | Padisetty et al. |
| 2005/0177269 | A1 | 8/2005 | Funk |
| 2005/0256964 | A1 | 11/2005 | Dube |
| 2005/0283786 | A1 | 12/2005 | Dettinger et al. |
| 2006/0122730 | A1 | 6/2006 | Niemela et al. |
| 2006/0271537 | A1 | 11/2006 | Chandrasekharan et al. |
| 2007/0174037 | A1 | 7/2007 | Ling |
| 2007/0186246 | A1 | 8/2007 | Goldhor |
| 2008/0092073 | A1 | 4/2008 | Shih et al. |
| 2009/0070121 | A1* | 3/2009 | Leonelli ............ G06Q 10/06 705/301 |
| 2009/0095807 | A1 | 4/2009 | Dickerson et al. |
| 2009/0198770 | A1 | 8/2009 | Jiang |
| 2009/0307105 | A1 | 12/2009 | Lemay et al. |
| 2010/0010908 | A1 | 1/2010 | Pasupulati et al. |
| 2010/0271989 | A1 | 10/2010 | Chernoguzov et al. |
| 2010/0299187 | A1 | 11/2010 | Duggal |
| 2011/0238969 | A1 | 9/2011 | Warkentin et al. |
| 2011/0246891 | A1 | 10/2011 | Schubert et al. |
| 2011/0295391 | A1 | 12/2011 | Schneider et al. |
| 2012/0036493 | A1 | 2/2012 | Moosmann et al. |
| 2012/0233588 | A1 | 9/2012 | Mruthyunjaya et al. |
| 2012/0311526 | A1 | 12/2012 | Deanna et al. |
| 2013/0201316 | A1 | 8/2013 | Binder et al. |
| 2013/0275560 | A1 | 10/2013 | Bestmann et al. |
| 2014/0101581 | A1 | 4/2014 | Lan et al. |
| 2014/0372963 | A1 | 12/2014 | Chandaria et al. |
| 2014/0372975 | A1 | 12/2014 | Chandaria et al. |
| 2015/0045960 | A1 | 2/2015 | Caron et al. |
| 2015/0127192 | A1 | 5/2015 | Phatak et al. |
| 2015/0199088 | A1 | 7/2015 | Chandaria et al. |
| 2015/0286362 | A1 | 10/2015 | Chandaria et al. |
| 2015/0331406 | A1 | 11/2015 | Wang |
| 2016/0043991 | A1* | 2/2016 | Eizadi .................. H04L 61/20 709/245 |
| 2016/0092064 | A1 | 3/2016 | Wu |
| 2016/0315872 | A1* | 10/2016 | Eizadi ............... G06F 9/45558 |
| 2016/0327925 | A1 | 11/2016 | Leonelli et al. |
| 2016/0357526 | A1 | 12/2016 | Soffer et al. |

FOREIGN PATENT DOCUMENTS

| | | | |
|---|---|---|---|
| CN | 101373441 | A | 2/2009 |
| CN | 101438299 | A | 5/2009 |
| CN | 102177501 | A | 9/2011 |
| CN | 102262557 | A | 11/2011 |
| CN | 102271153 | A | 12/2011 |
| CN | 102479079 | A | 5/2012 |
| CN | 102999322 | A | 3/2013 |
| EP | 3092561 | A1 | 11/2016 |
| JP | 2006216048 | A | 8/2006 |
| JP | 2008021095 | A | 1/2008 |
| JP | 2010539600 | A | 12/2010 |
| JP | 2011150430 | A | 8/2011 |
| JP | 2016112651 | A | 6/2016 |
| KR | 20080044576 | A | 5/2008 |
| WO | WO-2005050503 | A1 | 6/2005 |
| WO | WO-2013058768 | A1 | 4/2013 |
| WO | WO-2014/041623 | A1 | 3/2014 |
| WO | WO-2014204989 | A1 | 12/2014 |
| WO | WO-2017/027632 | A1 | 2/2017 |

OTHER PUBLICATIONS

International Search Report and written Opinion dated Oct. 4, 2016 for PCT Application No. PCT/US2016/041573.

International Search Report and written Opinion dated Apr. 13, 2017 for PCT Application No. PCT/US2016/067944, 14 pgs.

International Search Report and Written Opinion dated Nov. 15, 2017 for PCT Application No. PCT/US2017/047944.

International Search Report and Written Opinion dated Nov. 24, 2017 for PCT Application No. PCT/US2017/047964.

Extended European Search Report dated Oct. 23, 2017 for Application No. 15735508.2.

Singapore Written Opinion dated Jun. 11, 2018 for Application No. 11201708743U.

International Search Report and Written Opinion dated Jun. 15, 2018 for PCT Application No. PCT/US2018/022359.

Japanese Office Action dated Jun. 18, 2018 for Application No. 2016-521515.

Japanese Office Action dated Jun. 18, 2018 for Application No. 2016-521516.

Japanese Office Action dated Jun. 18, 2018 for Application No. 2016-521518.

Chinese Office Action dated Jun. 21, 2018 for Application No. 201480038517.8.

Haruyoshi Maruyama, "How to Use Device Driver Configurator," Interface, CQ Publishing Co., Ltd., vol. 33, No. 6, Jun. 1, 2007, pp. 57-70.

International Search Report and Written Opinion dated Apr. 22, 2019 for PCT Application No. PCT/US18/63704.

Kreger, Heather, "Web Services Conceptual Architecture (WSCA 1.0)," Internet Citation, May 2001.

Cano Julio et al: "Coordination of ECA Rules by Verification and Control", Jun. 3, 2014, International Conference on Computer Analysis of Images and Patterns, CAIP 2017. [Lecture Notes in Computer Science], Springer, Berlin, Heidelberg, pp. 33-48.

Partial Supplementary European Search Report for application No. EP 16880005, date Oct. 21, 2019.

PCT International Search Report and Written Opinion on application No. PCT/US2019/055109 dated Jan. 22, 2020.

\* cited by examiner

METHOD AND APPARATUS FOR TRIGGERING EXECUTION OF A WORKFLOW OVER A NETWORK

BACKGROUND

Field

Embodiments of the present invention generally relate to workflow deployment and execution, and, more particularly to a method, apparatus and user interface for triggering execution of one or more workflows over a network.

Related Art

A company can employ one or more business processes and other workflows to perform their core and ancillary businesses. These workflows may include, for example, a workflow to facilitate processing of information as it moves among or within any business disciplines, including purchasing, manufacturing, marketing, sales, accounting, recruitment, information-technology support and the like, of the company and/or its clients, vendors, supplier, etc.

To facilitate the processing of the information, this workflow defines two or more tasks, which are organized and connected in a particular, and hopefully, an efficient fashion. Each of the tasks may be any automatable activity of the business disciplines in which information input to such task ("input information") may be operated on and/or output. Examples of the tasks include downloading information from remote servers, converting files between formats, processing updates, communicating with customer or order-management systems, sending email messages, automatically backing up changes, etc.

Often, the input information for each of the tasks resides in or has to be entered (e.g., from physical files) into one or more data files of a plurality of computer systems of the company and/or its clients, vendors, supplier, etc. While some of these computer systems employ compatible platforms and protocols ("compatible systems"), some of the computer systems invariably employ disparate platforms and/or protocols ("incompatible systems"). Unfortunately, the incompatible systems make accessing and communicating the input information among the computer systems difficult, at best.

Conventional solutions for automating access to and/or communicating the input information between the compatible and incompatible systems include (i) manual solutions, and (ii) automatic solutions. The manual solutions utilize people to interface with the incompatible systems, whereby such people manually transfer the input information to and from the incompatible computers. The automatic solutions, on the other hand, employ customized software and/or hardware that are specifically adapted to interface with the incompatible systems ("customized interface").

While the conventional solutions may fit a particular need given a certain set of circumstances, such conventional solutions can be costly to the company in terms of time, money, and resources. For example, the company has an initial expense of time, money and resources to create, test, implement and provide support for an initial version of the customized interface. When, however, the input information resides on incompatible systems not considered or overlooked when creating the initial version of the customized interface, the company has an additional expense of time, money and resources to create, test, implement and provide support for an additional version of the customized interface. Moreover, the company may incur other additional expenses of time, money and resources to form new or reworked implementations when the customized interface no longer properly functions, if at all, due to updates, upgrades or other modifications to the computer systems, for example, modifications that may change network related configurations.

Therefore, what is needed is an apparatus and method for facilitating a generation, deployment and/or execution of a workflow in which access to and communication of input information among the computer systems having both compatible and disparate platforms and/or protocols does not require customized interfaces. That is, an apparatus and method for facilitating a generation, deployment and/or execution of a workflow that facilitates interoperability between the computer systems both compatible and disparate platforms and/or protocols. What is further needed is an apparatus and method for facilitating a generation, deployment and/or execution of a workflow in which access to and communication of input information and network settings may be provided despite updates, upgrades or other changes to the computer systems.

SUMMARY

Embodiments of the present invention generally relate to a method and apparatus for triggering execution of a workflow over a network, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So the manner in which the above recited features are attained and can be understood in detail, a more detailed description is described below with reference to the Figures illustrated in the appended drawings.

It is to be noted the Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

Embodiments of the present invention relate to method and apparatus for facilitating a generation, deployment and/or execution of a workflow over a network. Using a graphical user interface on a user device, a user defines a workflow for execution at remote devices, such as, devices providing remote services, for example, FACEBOOK, AMAZON, TWITTER, DROPBOX, email, fileserver, and the like. The user also defines network settings for enabling communication between the various remote devices, and between the remote devices and a host which deploys the workflow to the remote devices. The network settings may be defined by using the graphical user interface, otherwise selected using the user device, for example from the host or another device on the network. The network settings allow for various tasks of the workflow and/or various services provided by the remote devices to interact for, or as a consequence of, the execution of the workflow.

Architecture Example

Figure 1:
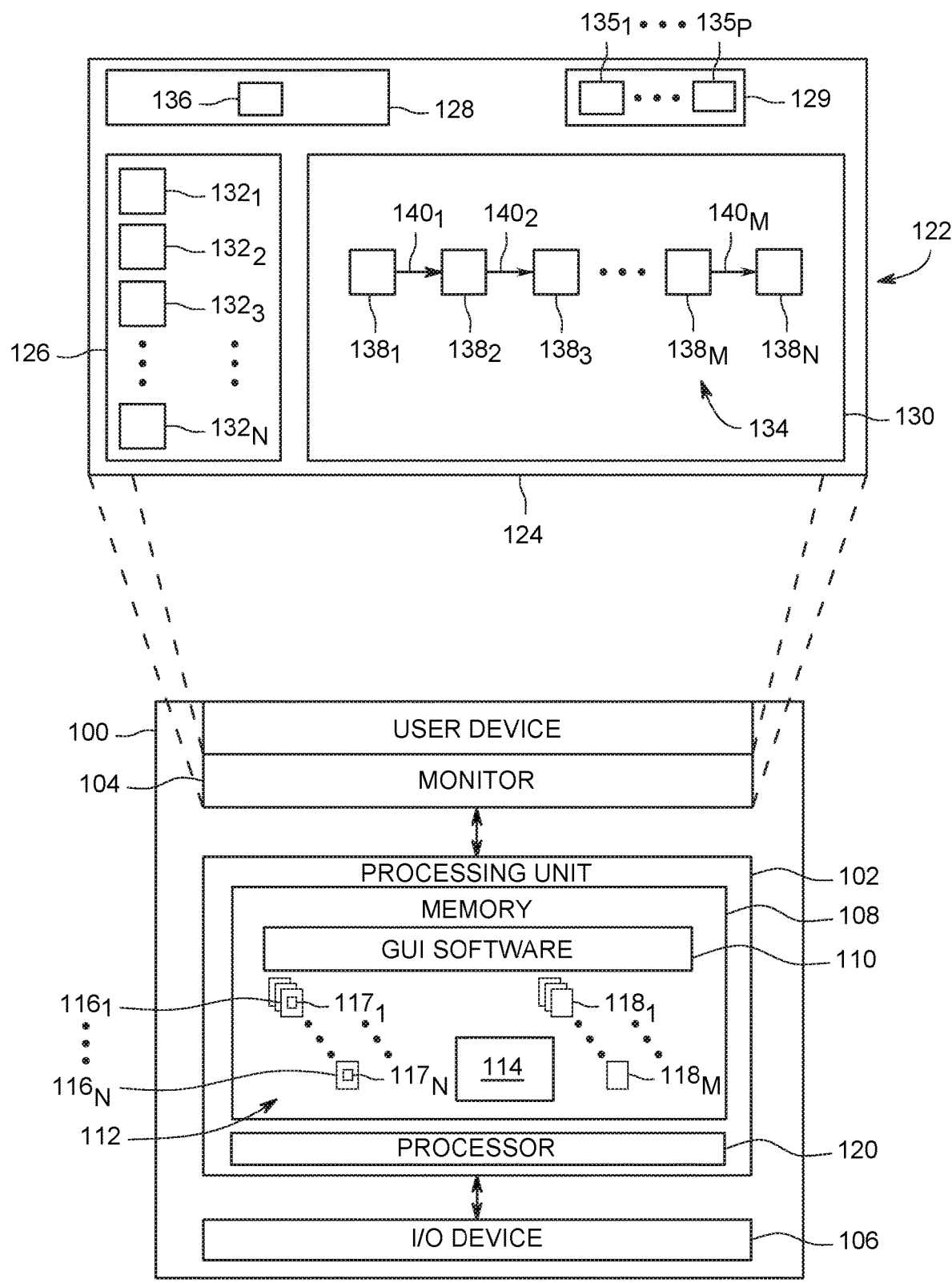
FIG. 1 is a block diagram illustrating an example of a user device for facilitating a generation, deployment and/or execution of a workflow over a network.

FIG. 1 is a block diagram illustrating an example of a user device 100 for facilitating a generation, deployment and/or execution of a workflow over a network. As above, this workflow includes a plurality of tasks; each of which defines a corresponding automatable activity ("task's function") for operating on and/or outputting information input into it.

The user device 100 may be, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the user device 100 includes a processor-based platform that operates on any suitable operating system, such as Microsoft® Windows®, Linux and/or Symbian; and that is capable of executing software.

The user device 100 may, however, include a large number of elements; many of which are not shown in FIG. 1 for simplicity of exposition. Details of example architecture of a user device, which may be representative of the user device 100, are described with reference to FIG. 3. As shown in FIG. 1, the user device 100 includes a processing unit 102 that is operable to control, manipulate or otherwise interact with a monitor or other display device (collectively "monitor") 104 and/or an input/output ("I/O") device 106, via respective couplings. The monitor 104 and the input/output device 106 include, respectively, monitors and input/output devices employed with user devices as described above and as generally known in in the art.

The processing unit 102 includes memory 108 that is capable of storing (i) software, such as graphical-user-interface ("GUI") software 110; and (ii) one or more records or other data structures (collectively, "records") 112, each of which may be stored as or in a single file or a plurality of files. The records 112 may be structured as text, a table, a database, a distributed hashtable, a distributed concurrent object store, a document formed using a markup or markup-like language, such as eXtensible Markup Language ("XML"), JavaScript Object Notation (JSON), eXtensible Markup Language-Remote Procedure Calling protocol ("XML/RPC"); or according to a given protocol, such as Hypertext Transfer Protocol ("HTTP"), Simple Object Access Protocol ("SOAP"); and the like.

The records 112 include a workflow record 114, workflow-operation records $116_1$-$116_n$, and workflow-sequencing records $118_1$-$118_m$. The workflow record 114 is/are stored, for example, as an XML document in one or more files. The workflow-operation records $116_1$-$116_n$ is/are stored in one or more files, and the workflow-sequencing records $118_1$-$118_m$, is/are stored in one or more files.

As described in more detail below, each of the workflow-operation records $116_1$-$116_n$ corresponds to one of the workflow's tasks. Each of these tasks is/are configured as a sequence of logical operations for completing such tasks along with preliminary set up operations and/or subsequent validation operations for achieving proper execution of the tasks. The task's logical, set-up and/or validation operations take the form of abstractions of functionality associated with one or more complex processes for obtaining, transforming and outputting information; rather than, taking form of information for performing individual low-level programming constructs that handle a small portion of such functionality, such as calling a given function or assigning a given value to a variable. To facilitate this, the workflow-operation records $116_1$-$116_n$ include one or more parameters for each of the corresponding tasks. The parameters for each of the tasks ("task parameters") include an indication of the task's function; one or more references to the task's input information, and/or one or more references to services, settings such as network setting configurations $117_1$-$117_n$ for communication between multiple devices that execute one or more of the workflow tasks or components thereof, rules, variables, expressions, templates, characteristics, directives, commands, fields, etc. for generating, deploying and/or executing the task.

Each of the workflow-sequencing records $118_1$-$118_m$ corresponds to a sequencing of one task to another task. To facilitate this, each of the workflow-sequencing records $118_1$-$118_m$ include one or more parameters associated with such sequencing ("sequence parameters"). The sequence parameters include an indication of the tasks for sequencing, an order of execution of the tasks, a set of conditions governing the order of execution of the tasks and/or one or more references to services, settings, rules, variables, expressions, templates, characteristics, directives, commands, etc. for generating, deploying and/or executing the sequencing.

The workflow record 114 includes the task parameters for all or a subset of the tasks and the sequence parameters for all or a subset of the sequences in the workflow. Alternatively, the workflow record 114 includes the task parameters for all or a subset of the tasks, and be arranged in a sequence in accord with the sequencing. The workflow record 114, workflow-operation records $116_1$-$116_n$, and workflow-sequencing records $118_1$-$118_m$ take other forms and include other information as well.

In addition to the memory 108, the processing unit 102 includes one or more processors (collectively "processor") 120 that execute (e.g., launches, generates, runs, maintains, etc.) and operates on a suitable operating system. The processor 120 is/are capable of executing the GUI software 110, storing the records 112 in the memory 108, dispatching the workflow record 114 to facilitate the generation, deployment and/or execution of the workflow, issuing triggers and/or issuing one or more commands and/or instructions to cause the generation, deployment and/or execution of the workflow. Examples of the processor 108 include conventional processors, microprocessors, multi-core processors and/or microcontrollers.

The GUI software 110, when executed by the processor 120, executes a GUI and render on the monitor 104 at least one display screen 122 of the GUI. The display screen 122 includes a window 124. The window 124, in turn, includes a widget pane 126, a widget toolbar 128, a workflow pane 130 and a network connectivity pane 129.

The widget pane 126 includes task widgets $132_1$-$132_n$. The task widgets $132_1$-$132_n$ represent, graphically, the tasks that are selected for inclusion in the workflow. Such selection is effected by including instances of the task widgets $132_1$-$132_n$ in a graphical representation of the workflow ("graphical workflow") 134 set forth on the workflow pane 130. The task widgets $132_1$-$132_n$, and any instances thereof, is/are rendered by the GUI software 110 as icons and the like.

The widget toolbar 128 includes a sequencing widget 136; instances of which also be used to form the graphical workflow 134, and in turn, the workflow. The sequencing widget 136 represents, graphically, a coupling that is/are used to couple together and sequence the tasks. The sequencing widget 136, and any instances thereof, is/are rendered by GUI software 110 as a connector line and the like.

The workflow pane 130 includes the graphical workflow 134. The graphical workflow 134 includes task-widget instances $138_1$-$138_n$ sequenced together with sequencing-widget instances $140_1$-$140_m$. Each of the task-widget instances $138_1$-$138_n$ is/are an instance of any of the task widgets $132_1$-$132_n$, and each of the sequencing-widget instances $138_1$-$138_m$ is/are an instance of the sequencing-widget 136.

The network connectivity pane 129 includes network setting widgets $135_1$, . . . $135_p$ (135). The network setting widgets 135 include options to select or otherwise input information relating to network settings associated with the execution of the workflow and the tasks therein. The GUI software 110 is/are used to select the appropriate network setting widgets 135, and to receive input related to one or more network settings. Each captured network setting is/are referred to as an instance of the network setting widget 135, and each network setting corresponds to execution of a task(s) or a part thereof, and communication setting between the devices involved in execution of such task(s). In some embodiments, information related to network settings is included directly in corresponding task-widget instances $138_1$-$138_n$, when the task-widget instances $138_1$-$138_n$ are configured, for example, using the GUI software 110, and in such embodiments, defining network settings associated with the tasks of the workflow does not require the use of network setting widgets 135.

The task-widget instances $138_1$-$138_n$ is/are associated with the workflow-operation records $116_1$-$116_n$, respectively; and the workflow-operation records $116_1$-$116_n$ include the task parameters of the tasks represented by the task-widget instances $138_1$-$138_n$. Further, the workflow-operation records $116_1$-$116_n$ include network setting configurations $117_1$-$117_n$, for example, as defined using network setting widgets 135, defined directly with the task-widget instances $138_1$-$138_n$, or otherwise defined. In some embodiments, the network setting configurations $117_1$-$117_n$ are stored as separate records, although, the network setting configurations $117_1$-$117_n$ are associated with the workflow-operation records $116_1$-$116_n$. Similarly, the sequencing-widget instances $140_1$-$140_m$ is/are associated with the workflow-sequencing records $118_1$-$118_m$, respectively; and the workflow-sequencing records $118_1$-$118_m$ include the sequence parameters of the sequences represented by the sequencing-widget instances $140_1$-$140_m$.

Although the workflow-operation records $116_1$-$116_n$ including the configured network setting configurations $117_1$-$117_n$, the workflow-sequencing records $118_1$-$118_m$, and the workflow record 114 are delineated above as four separate entities, the delineation and the use of four entities is/are dispensed with. For example, the workflow record 114 (or any other of the records 112) include the task parameters of the tasks represented by the task-widget instances $138_1$-$138_n$, the network setting information incorporated in the task-widget instances $138_1$-$138_n$, and the sequence parameters of the sequences represented by the sequencing-widget instances $140_1$-$140_m$.

Alternatively, the workflow record 114 (or any other of the records 112) include the task parameters of the tasks represented by the task-widget instances $138_1$-$138_n$, and be arranged in a sequence in accord with a sequencing represented by the collective sequences of the sequencing-widget instances $140_1$-$140_m$. To facilitate the foregoing, the task-widget instances $138_1$-$138_n$ and the sequencing-widget instances $140_1$-$140_m$ is/are associated with the workflow record 114, directly. The workflow record 114, the workflow-operation records $116_1$-$116_n$, the network setting configurations $117_1$-$117_n$, and the workflow-sequencing records $118_1$-$118_m$ take other forms and be arranged in other ways, as well.

Additionally, although the window 124 includes three panes and one toolbar, as shown, the window 124 includes more or fewer panes and more or fewer toolbars. In addition, the window 124 includes tabs, dropdown menus, command menus, etc. The widget pane 126 include more or fewer task-type widgets than shown; the network connectivity pane 129 include fewer or more network setting widgets 135, and the widget toolbar 128 include more sequencing-type widgets than shown.

As an alternative, the widget pane 126, the network connectivity pane 129 and the widget toolbar 128 is/are combined into a single pane or toolbar that includes both of the task-type and sequencing-type widgets. As another alternative, any combination of the widget pane 126, the network connectivity pane 129 and the widget toolbar 128 includes the task-type, network settings-type and sequencing-type widgets.

As yet another alternative, one or more of the sequencing-type widgets 136 is/are combined, integrated with or otherwise formed integral to the task widgets $132_1$-$132_n$ so as to form unified widgets. The unified widgets obviate having separate sequencing-type widgets for each task-type widget and network setting widgets. Such unified widgets are rendered by the GUI software 110 as icons having connector elements, and incorporating options to input network setting information, and the like. Instances of the unified widgets on the workflow pane 130 is/are associated with the workflow-operation records $116_1$-$116_n$, the network setting configurations $117_1$-$117_n$, and the workflow-sequencing records $118_1$-$118_n$. Alternatively, the instances of the unified widgets are associated with the workflow record 114 directly.

Operation Example

Figure 2:
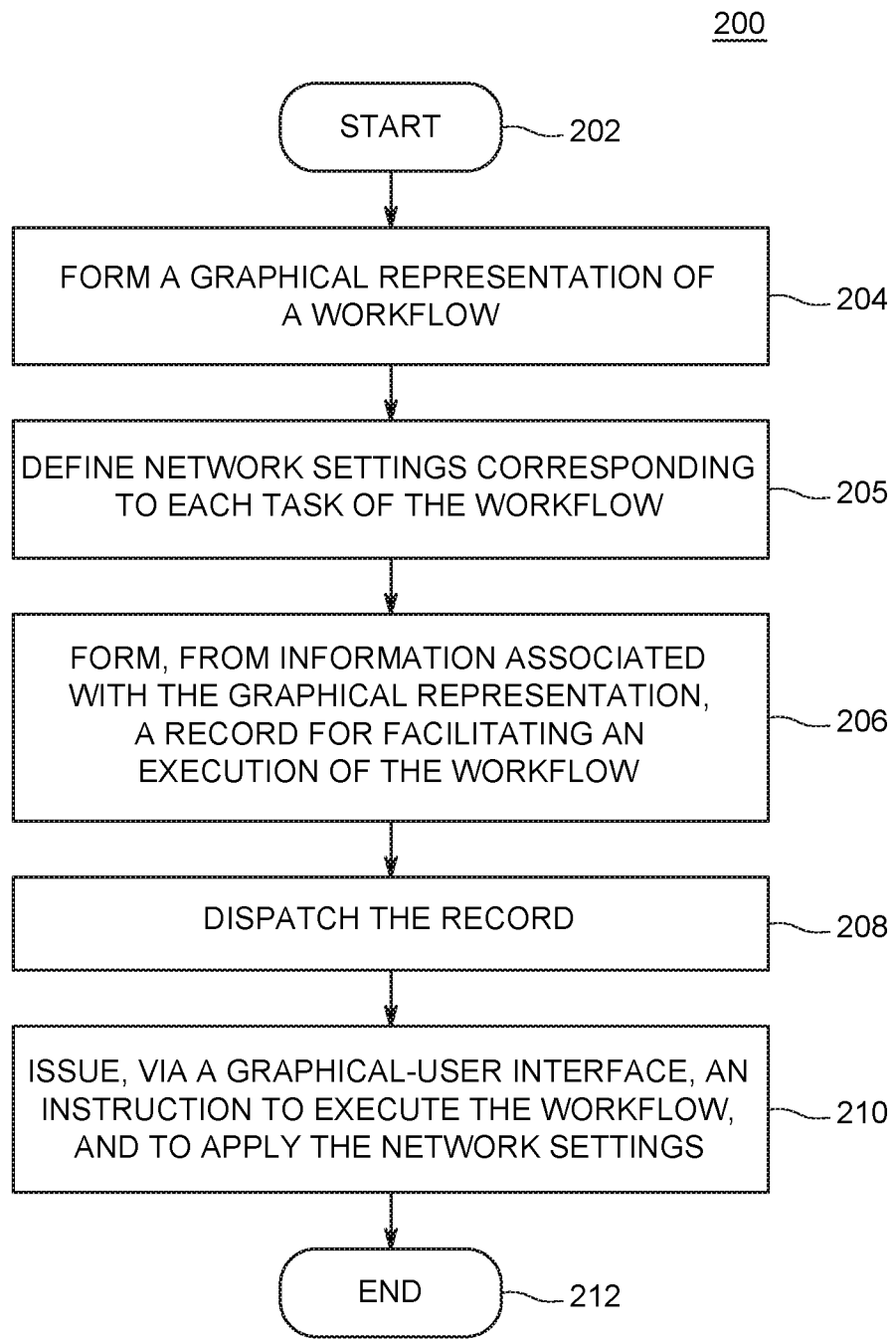
FIG. 2 is a flow diagram illustrating a flow for facilitating a facilitating a generation, deployment and/or execution of a workflow over a network.

Referring now to FIG. 2, a flow diagram illustrating a flow 200 or a process 200 or a method 200 for facilitating a generation, deployment and/or execution of a workflow is shown. For convenience, the flow 200 is described with reference to the user device 100 of FIG. 1. The flow 200, however, is carried out using other architectures as well.

The flow 200 starts at termination block 202, whereupon the processor 120 executes the GUI software 110 to form the GUI and render the display screen 124. After termination block 202, the flow 200 transitions to process block 204.

As shown in process block 204, the GUI software 110 forms the graphical workflow 134. The GUI software 110 does so in response to one or more manipulations of the GUI by the user via the I/O device 106. For example, the GUI software 110 render the task-widget instances $138_1$-$138_n$ on workflow pane 130 responsive to the I/O device 106 manipulating the GUI to select from the task widgets $132_1$-$132_n$ and to place (e.g., by dragging and dropping) such instances on the workflow pane 130.

In addition, the GUI software 110 render the sequencing-widget instances $140_1$-$140_m$ on workflow pane 130 in response to the I/O device 106 manipulating the GUI to (i) select such instances from widget toolbar 128, (ii) place the instances on the workflow pane 130, and (iii) couple the task-widget instances $138_1$-$138_n$ with the sequencing-widget instances $140_1$-$140_m$.

The GUI software 110 obtains, via manipulation of the GUI by the I/O device 106, the task and sequence parameters for populating the records 114, $116_1$-$116_n$ and $118_1$-$118_m$. For example, the GUI software 110 obtains, as a function of the presence of the task-widget instances $138_1$-$138_n$ in the graphical workflow 132, the task parameters that define the tasks' functions. The task-widget instance $138_1$ represents a task for starting the workflow ("start task"), for instance. The start task's parameters include information for the start task's function, which as noted, is to mark a start the workflow. The presence of the task-widget instance $138_1$ in graphical workflow 134 allows for population of the records 114 and/or $116_1$-$116_n$ with the start task's parameters.

Alternatively and/or additionally, the GUI software 110 supplement the start and/or other tasks' parameters by way of a user using a keyboard or other I/O device to enter a character or a string of characters into one or more fields of one or more display screens (not shown) of the GUI. Entering the information this way also be used as an alternative to selecting and placing (e.g., dragging and dropping) the task-widget instances $138_1$-$138_n$ onto the workflow pane 130. For example, the user enter a character or a string of characters into one or more of the fields of the display screens of the GUI for each of the task-widget instances $138_1$-$138_n$. The GUI software 110, in turn, interprets such entries, and responsively renders the task-widget instances $138_1$-$138_n$ on the GUI.

Like the task parameters, the GUI software 110 obtains, as a function of the presence and layout of the graphical workflow 132, the sequence parameters that is/are used to develop an order of execution of the task-widget instances $138_1$-$138_n$. For example, the sequence parameters are obtained as a function of each of the links (as rendered by the sequencing-widget instances $140_1$-$140_m$) that connect an output of one of the task-widget instances $138_1$-$138_n$ to an input of another of the task-widget instances $138_1$-$138_n$. Alternatively and/or additionally, the GUI software 110 obtains the sequence parameters by way of entering a character or a string of characters into one or more fields of one or more display screens (not shown) of the GUI. Entering the parameters this way, in turn, provides an alternative to selecting and placing the sequencing-widget instances $140_1$-$140_m$ on the workflow pane 130. As above, the GUI software 110, in turn, interprets the entries, and responsively renders the sequencing-widget instances $140_1$-$140_m$ that create the links connecting the task-widget instances $138_1$-$138_n$.

After process block 204, the flow transitions to process block 205. As shown in process block 205, the GUI software 110 receives network settings associated with the tasks of the workflow. For example, the GUI software 110 enables input of network settings using network setting widgets 135, or otherwise using any I/O device configured to provide input to the GUI software 110. The input of network settings include manual entry of network settings, for example, by typing on a keyboard or by using a pointer to select an element on the network connectivity pane 129, or a combination thereof. The input of network settings also include selecting of one or more settings from an available network settings library located on the user device 100, or remote to the user device 100, for example, a device located on a network to which the user device 100 is communicably coupled. In some embodiments, the network settings are also input to the task-widget instances $138_1$-$138_n$. Using one or more of the techniques described above, network settings are defined corresponding to each task of the workflow.

After process block 205, the flow transitions to process block 206. As shown in process block 206, the GUI software 110 generates or otherwise forms the workflow record 114 from the graphical workflow 134. The GUI software 110, for example, populate the workflow record 114 with the task and sequence parameters that it garnered in process block 204, and optionally the network setting configurations that it garnered in process block 205. Specifically, depending on a user preference, for example, a preference provided by a user to the GUI software 110 or an otherwise configured preference, the GUI software 110 populates the workflow record 114 with the network settings corresponding to the tasks of the workflow received at process block 205. In other embodiments, the GUI software 110 creates a separate network settings record (not shown), which is/are utilized for the execution of the workflow in a manner similar to the use of the network settings populated in the workflow record 114.

As alternative to populating the workflow record 114 directly, the GUI software 110 populate the workflow-operation records $116_1$-$116_n$, the network setting configurations $117_1$-$117_n$, and the workflow-sequencing records $118_1$-$118_m$, first. For example, the GUI software 110 populate the workflow-operation records $116_1$-$116_n$ with the task parameters associated with the task-widget instances $138_1$-$138_n$ garnered in process block 204. In addition, the GUI software 110 populate the workflow-sequencing records $118_1$-$118_m$ with the sequence parameters associated with the sequencing-widget instances $140_1$-$140_m$ garnered in process block 204. Further, the GUI software 110 populate the network setting configurations $117_1$-$117_n$ with the information on network setting for each task-widget instance $138_1$-$138_n$ as in the process block 205. After populating the workflow-operation and workflow-sequencing records $116_1$-$116_n$, $118_1$-$118_m$, and network setting configurations $117_1$-$117_n$, the GUI software 110 inserts the workflow-operation records $116_1$-$116_n$ and the network setting configurations $117_1$-$117_n$ into the workflow record 114 in accordance with the sequencing.

Additionally, the GUI software 110 arranges the records 114, $116_1$-$116_n$, network setting configurations $117_1$-$117_n$ and $118_1$-$118_m$ in a particular fashion. For example, the task and sequence parameters in records 114, $116_1$-$116_n$ and $118_1$-$118_m$, and information in network setting configurations $117_1$-$117_n$ is/are arranged, in terms of object-oriented programming, as respective instances of objects of one or more given classes. As an example, the task-widget instances $138_1$-$138_n$ defines, respectively, the start task and a task for stopping the workflow ("stop task"). The workflow-operation records $116_1$, $116_2$ define the task parameters for deployment of start and stop instances of start and stop objects of start and stop classes, respectively and similarly, the network setting configurations $117_1$-$117_n$ define the network settings for start and stop instances of start and stop objects of start and stop classes, respectively. The workflow-sequencing records $118_1$-$118_m$ and workflow record 114 is/are arranged in a similar fashion.

The GUI software 110 also prepares the workflow record 114 for dispatch to a target device to facilitate generating, deploying and/or executing the workflow. For example, the GUI software 110 formats the workflow record 114 according to one or more suitable information exchange mechanisms. Examples of such exchange mechanisms include: American Standard Code for Information Interchange ("ASCII"), XML, XML/RPC, HTTP, SOAP, shared memory, sockets, local or remote procedure calling, etc. In addition to facilitating sharing and replication of the workflow record 114, the exchange mechanisms also beneficially facilitate interoperability between the processing unit 102 and the target device, such as the host device 306 (FIG. 3), to which the workflow record 114 is/are dispatched.

After process block 206, the flow 200 transitions to process block 208. As shown in process block 208, the GUI software 110 dispatch the workflow record 114 to facilitate generating, deploying and/or execution of the workflow. To do this, the GUI software 110 cause the processing unit 102 to dispatch the workflow record 114 from the user device 100 to the target device. The dispatch occurs in response to a trigger initiated by the GUI software 110 (e.g., in response to the user's manipulation of the GUI), or in response to a query from the target device.

Alternatively, the GUI software 110 cause the processing unit 102 to dispatch the workflow record 114 on a periodic basis using, for example, a routine for synchronizing and/or replicating the workflow record 114 on the target device. After process block 208, the flow 200 transitions to process block 210.

As shown in process block 210, the GUI software 110 cause the processing unit 102 to issue commands, which emanate from the GUI, to cause application of the network settings, and execution of the workflow. The execution commands are, for example, a trigger emanating from the GUI. This trigger is/are initiated in response to the user's manipulation of the GUI. Alternatively, a user manipulate the GUI to trigger the commands based on other conditions on the user device being met, for example, an output of a job-scheduler application output (e.g. a CRON job), an output of an application without a user interface running on the user device (e.g. a C++ application), or an output by another application running on the user device, based upon a condition being met, such as a state of data related to the application (e.g. Microsoft Access database cell achieving a particular value, or Visual Basic for Applications for Microsoft Excel), among other applications.

The GUI software 110 cause the processing unit 102 to issue the application of network settings and the execution commands at any time after or at the same or substantially the same time as the time of dispatch of the workflow record 114. As described in more detail below, the target device, responsive to either the execution command or the application of network settings command, interpret the workflow record 114 or the network setting configurations portion of the workflow record 114, respectively, directly to execute the workflow.

As an alternative to directly interpreting the workflow record 114, the target device generates, as a function of the workflow record 114, computer-executable instructions (or, simply, "code") for accomplishing the workflow ("workflow-executable code"). Further, the target device generates or extracts network setting configurations from the workflow record 114, for application to additional devices. The target device generates the workflow executable code and the network setting configurations at a time prior to execution time or at the same or at substantially the same time as execution time. To facilitate the former, the GUI software 110 and/or the processing unit 102 issue, prior to the execution command, other commands to cause the target device to generate the workflow-executable code and the network setting configurations. The target device also generates one or more tests for testing the workflow-executable code and the network setting configurations. Unless otherwise mentioned hereinafter, workflow includes the network setting configurations, which are for application prior to the execution of the workflow. In some embodiments, the network setting configurations 117 are physically stored separately, and sent separately from the workflow record 114, however, in either case, the network settings are applied for enabling the execution of the workflow, and specifically for enabling execution of the tasks therein on various devices. The execution of tasks require communication between various devices or the tasks place a remote call to or exchange data with other tasks on various devices, and the network settings enable connectivity between such various devices to enable the communication required for the execution of tasks.

After the process block 210, the flow 200 transitions to termination block 212, at which point the flow 200 terminates. Alternatively, the flow 200 is repeated periodically, in continuous fashion, or upon being triggered as a result of a condition, such as an addition, deletion or modification of one or more of the tasks of the workflow. As another alternative, the process block 210 is repeated periodically, in continuous fashion, or upon being triggered as a result of a condition, so as to cause additional deployments of the workflow.

System Architecture Example

Figure 3:
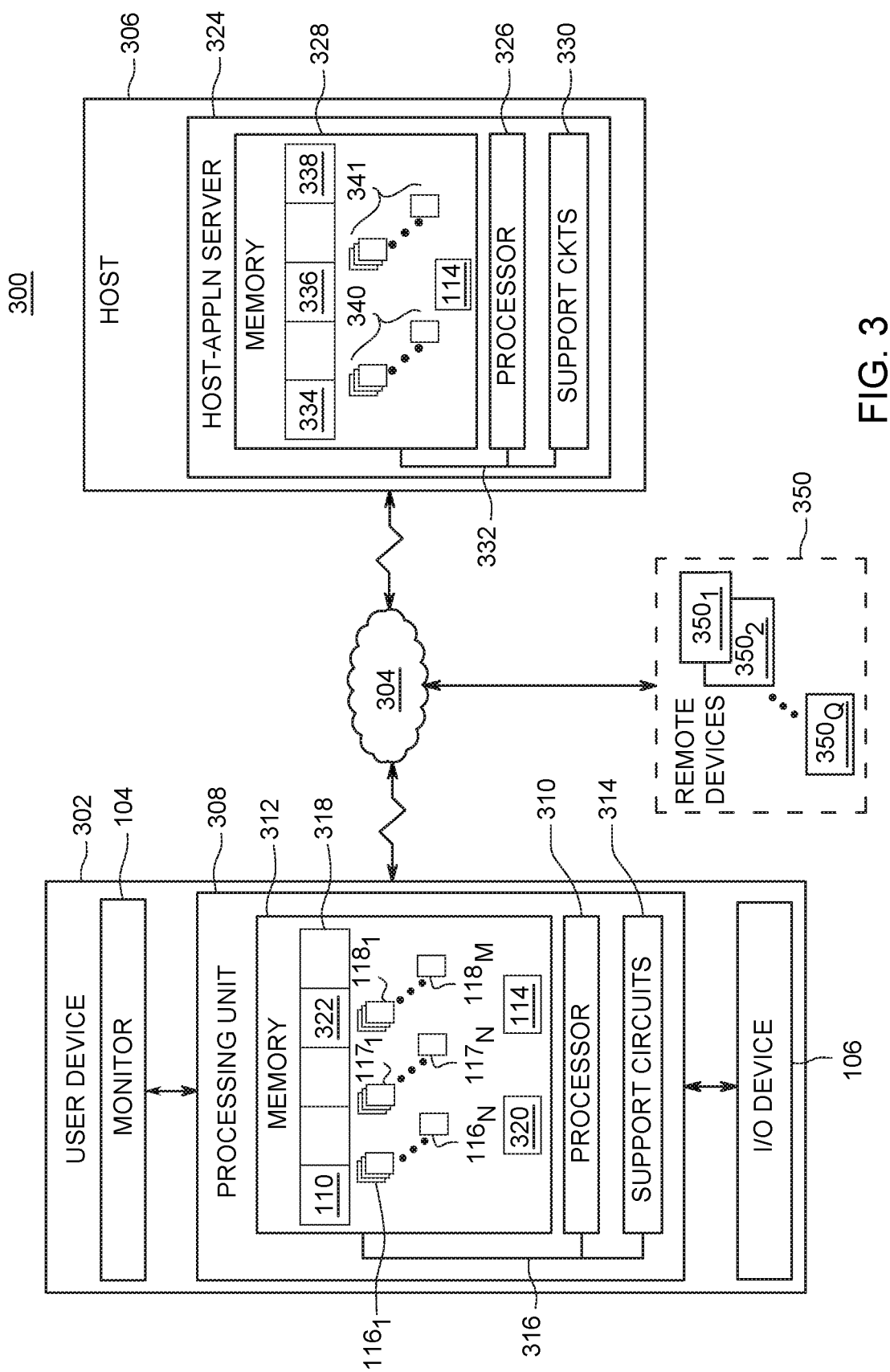
FIG. 3 is a block diagram illustrating a system for generating, deploying and/or executing a workflow over a network.

FIG. 3 is a block diagram illustrating a system 300 for facilitating generation, deployment and/or execution of a workflow. The system 300 includes a user device 302, a host device ("host") 306, and one or more remote devices $350_1$, $350_2$, ... $350_Q$ (collectively, "350"). The user device 302, the host 304 and the remote device(s) 350 are communicatively coupled together via a network 304. This way, the user device 302 and host 304 exchanges the input and/or deployment information and other information associated with deploying the workflow, for example, on the remote devices 350, including the information regarding network settings for connectivity among the various remote devices 350, between the host 306 and the remote devices 350, and between the user device 302 and the remote devices 350, via one or more communications carried over the network 304.

The network 304 is a partial or full deployment of most any communication or computer network, including any combination of a public or private, terrestrial wireless or satellite, or wireline network. As such, the network 302 include network elements from a Public Switch Telephone Network ("PSTN"), the Internet, core and proprietary public networks, wireless voice and packet-data networks, such as 1G, 2G, 2.5G and 3G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like.

The network elements include circuit-switched as well as packet-data elements to provide transport of the workflow record 114, the triggers, the execution command and other information for generating, deploying and/or executing the workflow including application of network settings (collectively "workflow content"), and are configured to communicate such workflow content using any number of protocols and in any manner consistent with providing such information to the user device 302 and host 304. These protocols include standardized, proprietary, open-source, and freely-available communication protocols for communicating content in circuit-switching and/or packet data networks, and the like.

The user device 302 is similar to the user device 100 of FIG. 1, except as described herein below. The user device 302 is any computing device, system and the like, and may be formed in a single unitary device and concentrated on a single server, client, peer or other type node. Alternatively, the user device 302 may be formed from one or more separate devices, and as such, may be distributed among a number of server, client, peer or other type nodes. In addition, the user device 302 is scalable (i.e., may employ scale-up and/or scale-out approaches).

As shown, the user device 302 includes a processing unit 308 that is operable to control, manipulate or otherwise interact with the monitor 104 and/or an I/O device 106, via respective couplings. The processing unit 308 includes one or more processors (collectively "processor") 310, memory 312, supports circuits 314 and bus 316. The processor 310 is one or more conventional processors, microprocessors, multi-core processors and/or microcontrollers. The support circuits 314 facilitate operation of the processor 310 and include well-known circuitry or circuits, including, for example, an I/O interface; one or more network-interface units ("NIUs"); cache; clock circuits; power supplies; and the like.

The processor 310 uses the NIUs for exchanging the workflow content the host 306 via the network 304. Accordingly, the NIUs are adapted for communicating over any of the terrestrial wireless, satellite, and/or wireline media.

The memory 312 stores (and receive requests from the processor 310 to obtain) software 318, the records 112, 114, $116_1$-$116_n$. $117_1$-$117_n$ and $118_1$-$118_m$ and various other stored software packages, such as an operating system 320. The memory 312 is or employ random access memory, read-only memory, optical storage, magnetic storage, removable storage, erasable programmable read only memory and variations thereof, content addressable memory and variations thereof, flash memory, disk drive storage, removable storage, any combination thereof, and the like. In addition, the memory 312 stores (and receive requests from the processor 310 to obtain) operands, operators, dimensional values, configurations, and other data that are used by the operating system 320 and the software 318 to control the operation of and/or to facilitate performing the functions of the user device 302.

The bus 316 provides for transmissions of digital information among the processor 310, the memory 312, support circuits 314 and other portions of the user device 302 (shown and not shown). The I/O interface is adapted to control transmissions of digital information between (shown and not shown) components of the user device 302. In addition, the I/O interface is adapted to control transmissions of digital information between I/O devices disposed within, associated with or otherwise attached to the user device 302. Examples of the I/O devices include the I/O device 106, the monitor 104, and any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) the like.

The operating system 320 includes code for operating the user device 302 and for providing a platform onto which the software 318 can be executed. The software 318 include the GUI software 110 and other user-device software 322, which perform the exchange of the workflow content using communication and security protocols compatible with the user and host devices 302, 306.

The GUI software 110 and user-device software 322 are in any of a standalone, client/server, peer-to-peer and other format. The GUI software 110 includes code for accessing one or more services offered by the host 306. Using this code and information obtained from a user, the GUI software 110 is operable to substantiate its identity, and in turn, receive authorization to access (e.g., view, configure and/or execute) the services offered by the host 306.

The host 306 includes one or more servers, including a host-application server 324. The host-application server 324 is deployed in one or more general or specialty purpose computers, personal computers, mainframes, minicomputers, server-type computers and/or any a processor-based platform that operates on any suitable operating system, such as Microsoft® Windows® and/or Linux; and that is capable of executing software.

Like the user device 302, the host-application server 324 includes a large number of elements; many of which are not shown in FIG. 3 for simplicity of exposition. The elements of host-application server 324 are formed in a single unitary device and concentrated on a single server, client, peer or other type node. Alternatively, the elements of the host-application server 324 are formed from two or more separate devices, and as such, are distributed among a number of server, client, peer or other type nodes.

As shown, the host-application server 324 includes one or more processors (collectively "processor") 326, memory 328, supports circuits 330 and bus 332. The processor 326 is one or more conventional processors, microprocessors, multi-core processors, microcontrollers and the like.

The bus 332 provides for transmissions of digital information among the processor 326, memory 328 and support circuits 330 and other portions of the host-application server 324 (not shown). The support circuits 330 facilitate operation of the processor 326, and include well-known circuitry or circuits, including, for example, one or more input/output I/O interfaces; one or more NIUs; cache; clock circuits; power supplies and the like.

The I/O interface provides an interface to control the transmissions of digital information between components of host-application server 324 (shown and not shown). In addition, the I/O interface provides an interface to control the transmissions of digital information between I/O devices (not shown) associated with or otherwise attached to the host-application server 324. The I/O devices (not shown) are embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The NIUs facilitate exchange (e.g., sending and/or receiving) of the workflow content. Accordingly, the NIUs are adapted for communicating over terrestrial wireless, satellite, and/or wireline media.

The memory 328 stores and is queried by the processor 326 to obtain various software packages, such as operating system 334, application-server software 336 and workflow-application software 338. The memory 328 is or employs random access memory, read-only memory, optical storage, magnetic storage, removable storage, erasable programmable read only memory and variations thereof, content addressable memory and variations thereof, flash memory, disk drive storage, removable storage, any combination thereof, and the like.

In addition, the memory 328 stores the workflow record 114, one or more libraries 340 for generating the workflow-executable code, and one or more network setting libraries 341 for resolving, supplementing or otherwise enabling network setting configurations in applying the appropriate network settings for execution of the workflow. The libraries 340, which are written in C++, for example, and include routines for generating the workflow-executable code that is associated with each of the tasks ("task routines"). Additionally, the libraries 340 include routines for sequencing the task routines in accordance with the sequence parameters set forth in the workflow record 114 ("sequence routines").

The application-server software 336 is an application on the server to execute various host 306 processes. The application-server software 336 is an application framework comprised of the applications 570-574, for example as described with respect to FIG. 5.

The network setting libraries 341 include a repository of network connectivity configuration information relating to connectivity between various devices on which the workflow is executed, or exchange data with, for various tasks that form a part of the workflow. Network connectivity configuration information includes type of network, connection mode, connection settings and connection parameters, among other network connectivity related information. Type of networks includes different type of networks as described with respect to, for example, network 304, and include, without limitations Public Switch Telephone Network ("PSTN"), the Internet, a proprietary public network, a wireless voice and packet-data network, 1G, 2G, 2.5G, 3G, 4G or LTE telecommunication network, a wireless office telephone system ("WOTS"), a wired or wireless local area network ("LAN"), Bluetooth network, IEEE 802.11 WLAN, a wired or wireless personal area network ("PAN"), or a wired or wireless metropolitan area network ("MAN"), for example. Connection mode refers to the communication mode used for connecting with the network, for example, WiFi, Bluetooth, Infrared Data Connection, Ethernet, or other wireless or wired connection modes. Connection settings include information regarding ports and interfaces according to workflow tasks and devices, and also include one or more of standardized, proprietary, or open-source communication protocols. Connection parameters include information related to operationalizing a connection, e.g. authorization or identity substantiation information, communication bandwidth requirements, bandwidth restrictions, IP address restrictions, among several other such parameters. Further, authorization information include, for example, access credentials (e.g. user ID and a password), public and private key pairs, etc. for logging into a network for enabling connectivity between multiple devices for executing various tasks of the workflow. Network setting configurations or network settings include all the information above, and other information that may be needed to enable connectivity of remote devices to a network, including, without limitation, network name, connection protocol, SSID, access tokens, access keys, encryption and/or decryption mechanisms, among various others. TABLE 1 further illustrates a few non-limiting examples of network settings.

TABLE 1

| Type | Parameter | Example/Comments |
|---|---|---|
| Credential Profile | Username | Username for a web service like FACEBOOK, TWITTER, etc. |
| Credential Profile | Password | Password for a web service like FACEBOOK, TWITTER, etc. |
| Credential Profile | API Key | Developer API key given by web services like FACEBOOK, TWITTER, etc. There can be several API keys |
| Credential Profile | API Secret | Developer API secret given by web services like FACEBOOK, TWITTER, etc. There can be several API secrets |
| Connection Profile | Connection Profile name | Allows selection of different Connection profiles |
| Connection Profile | Type | Wifi, Bluetooth, Zigbee, GSM, CDMA, other cellular connectivity modes and associated profiles |
| Connection Profile | Security Type | WPA, WEP, unsecured, . . . |
| Connection Profile | SSID/ Network Name | WiFi network identifier, Access Point Names (APN), . . . |
| Connection Profile | Password | Network password |

TABLE 1-continued

| Type | Parameter | Example/Comments |
| --- | --- | --- |
| Connection Profile | Network | Mac address |
| Connection Profile | Network | IP address |
| Connection Profile | Transport Protocol | MQTT, CoAP, HTTP/S, . . . |
| Connection Profile | Role | Gateway or Edge |

Each remote device 350 connected to the workflow-execution software 336 is registered, that is, connected to the host 306 via the network 304 and thereby each remote device 350 is accessible to the host 306, and conversely, each remote device, when registered, can communicate with the host 306. Registration of remote devices 350 includes manually entering the network parameters necessary to access the remote device (together referred to as network settings), and for example, including at least some parameters listed in TABLE 1. Further network settings may be stored on the host 306, or another network device remote to the host, and the network settings are used by the host 306 for generating workflow-executable code for the remote devices 350. The workflow-executable code includes network connection parameters (for example, network settings for the remote device to connect to a local WIFI network). In some embodiments, the host 306 sends network settings to the remote devices 350, although application of the network settings can be started by the host 306 or the remote devices 350. In some embodiments, the remote devices 350 query the host 306 at a pre-defined frequency, or at occurrence of an event, and therefore, the remote devices 350 need not be connected to the network 304 at all times. In some embodiments, the server may push information to the remote devices 350 at a pre-defined frequency, or at occurrence of an event, and therefore, the information flow between the server 306 and the remote devices 350 is bi-directional.

Additionally, network setting libraries 341 also include a catalog of various network connectivity configuration information for easy searchability, and a cross-reference between all network connectivity configuration information, to identify suitable portion of the information based on available information. For example, if it is determined that the network type is the Internet, and connection mode is WiFi, then it may be inferred that connection parameters such as a user ID (e.g. SSID) and a password (WEP key or other applicable key depending on the WiFi network) are needed to enable the connection.

Collectively, the network connectivity configuration information, in the context of execution of the workflow as described herein is also referred to as network settings, and specific configuration setting applied to execution of a task, or execution on a device, or both, is referred to as network setting configuration, and each of these pertain to connectivity settings between the user device, the host and multiple remote devices, or remote services. The network setting libraries 341 supplement information contained in the network setting configurations, e.g., network setting configurations 117, and information from the network setting libraries 341 are combined with the network setting configurations 117 to form an implementable network setting, although in several embodiments, network setting configurations 117 are complete and directly implementable.

Further, the network setting configurations include connectivity configuration information for remote devices as well as the host.

The network setting libraries 341 catalogs and cross-references all network connectivity configuration information for easy querying, and include modules for searching and/or identifying relevant information for a particular task, device or other network connectivity related parameters. Further, the network setting libraries 341 include code to determine "if-then" scenarios, for example, to provide readily available network settings depending upon characteristics of various devices and workflow tasks, and known network connectivity configuration information (e.g. one or more of available networks, connection mode, connection settings, connection parameters etc.). Using such code, network configuration settings for various tasks and/or devices can be determined. For example, if it is determined that network configuration for a particular remote device executing a task, for example, the network type available is WiFi, then the code identifies the appropriate connection parameters for the WiFi network for applying to the particular remote device. An SSID and a WEP key associated with the WiFi network is identified by the code, for example, by using cross-referencing information or by searching the network setting libraries 341, and the SSID and the WEP key are identified for application to the remote device as a part of the network settings. Such information is then sent to the workflow-execution software 338 for applying to the particular remote device to ensure that the remote device has the required connectivity for executing the tasks assigned for execution on the particular remote device. The workflow-execution software 338 is also responsible for maintaining an updated status of the network connectivity configuration information for the remote devices, the host and the user devices, for example, by storing a status table (not shown) in the network setting libraries 341.

In some embodiments, the workflow-execution software 338 causes a change in network setting configuration required for execution of one or more tasks, for example, for more efficient execution, or failure of a task or a device while executing a workflow, and in such embodiments, the workflow-execution software 338 queries the network setting libraries 341 to receive a new network setting configuration for execution of the one or more tasks.

According to some embodiments, the network setting libraries 341 are used for populating network setting widgets 135 of FIG. 1, by sending network connectivity configuration information pertaining to various task types for the task widgets 132, from the network setting libraries 341 to the user device 100 or 302, over the network 304. In some embodiments, the network connectivity configuration information pertaining to a task type corresponding to a selected task widget 132 is automatically sent to the user device 100 or 302 in response to the selection. Such network connectivity configuration information is already configured appropriately for execution of the workflow, however, changes are made, for example, using the GUI software 110 if needed.

While the network setting libraries 341 are shown as a part of the host-application server 306, the network setting libraries 341 are implemented anywhere on the network 304, for example, the user device 302, other devices remote to the host 306, or as an independent database communicably coupled to the network 304.

The memory 328 also stores operands, operators, dimensional values, configurations, and other data that is used by the application-server software 336 and the operating system 334 to control the operation of and/or facilitate performing the functions of the host-application server 324.

The host-application server 324 is deployed in accordance with the scale-up and/or scale-out approaches. Using the scale-up approach, the host-application server 324 increases its processing power, amount of memory and number of networkable connections by utilizing a symmetrical, multi-processor architecture so as to provide additional capacity. A benefit of this scale-up approach is that such approach provides for simplified configuration and management as compared to the scale-out approach. Using the scale-out approach, the host-application server 324 increases its processing power, amount of memory and number of networkable connections by incrementally adding and/or removing capacity as needed, balancing workload across multiple processors, multiple servers, dedicating specific processors and/or servers for performing specific tasks, using physical or logical servers (e.g., a multi-node cluster approach), etc.

The operating system 334 includes and/or be embodied in various software and/or executable instructions or code for operating the host-application server 324. The operating system 334, when executed by the processor 326, provides a platform on which the application-server software 336 and workflow-application software 338 can be executed.

The workflow-application software 338, when executed by the processor 326, is operable to generate, deploy and/or execute the workflow, including applying the network settings for executing the workflow. To facilitate this, the workflow-application software 338, for example, includes code for directly interpreting the workflow record 114 at execution time so as execute the workflow and apply the network settings responsive to the execution commands, for example, received from the GUI software 110 of the user device 302.

Alternatively, the workflow-application software 338 is operable to obtain the workflow record 114, and generate, as a function of the workflow record, the workflow-executable code.

The workflow-application software 338 includes code for parsing the task and/or sequence parameters, and network setting configurations from the workflow record 114 ("parsed information"). The workflow-application software 338 also includes functionally for verifying that the workflow record 114 is well formed and valid.

The workflow-application software 338 includes code for inspecting the parsed information to determine which of the libraries 340 correspond to the tasks, which of the network setting libraries 341 correspond to the network setting configurations, and for combining the parsed information with one or more of such libraries 340 so as to form sets of code ("parsed-code sets") or combining the parsed network setting configuration with one or more such network setting libraries 341 to form sets of implementable network settings. To facilitate this, the workflow-application software 338 also includes code for sequencing the parsed information in accordance with sequencing reflected in the parsed information. The workflow-application software 338 also includes code for arranging or rearranging, dynamically and/or via user interaction, the parsed information so as to deviate from the sequencing reflected in the parsed information and provide another order of execution of the task of the workflow. This is done for efficiency (e.g., by analyzing the parse information and determining an optimally-efficient execution sequence), handing branching, handling errors, generating alternate or backup network connections and/or configurations, etc.

The workflow-application software 338 also includes code for combining with the parsed-code sets with one or more of the libraries 340 or one or more network setting libraries 341 for binding the parsed-code sets together ("binding libraries"). This code uses the binding libraries to facilitate transfer of appropriate portions of the task and/or sequence parameters, and network setting configurations between adjacent parsed-code sets.

The workflow-application software 338 optionally includes code for compiling the workflow-executable code for execution by the workflow-application software 338. Alternatively, the workflow-application software 338 might not compile the workflow-executable code until runtime, or at all, depending on which programming language is used to generate the workflow-executable code, or if all parsed-code sets are pre-compiled.

The workflow-application software 338, when executed by the processor 326, is operable to apply the network setting configurations and execute the workflow-executable code. The workflow-application software 338 applies the network setting configurations or executes the workflow-executable code in response to receiving or otherwise obtaining the appropriate command via the network 304.

The remote devices 350 are remote to the host-application server 324 and the user device 302. In some embodiments, one or more remote devices may provide remote services, for example, services provided by AMAZON, FACEBOOK, INSTAGRAM, DROPBOX, or include configured services such as mail server, an FTP server, a file server, a database server, an HTTP server, a web server, or any server exposed as a web service, and the like, among several other such commercially available or on-site configured services. Such remote devices include devices upon which one or more tasks of a workflow may be deployed and/or executed. The remote devices 350 ($350_1$, $350_2$, . . . $350_Q$) are communicably coupled to each other, for example, via the network 304. The remote devices 350 ($350_1$, $350_2$, . . . $350_Q$) may also be communicatively coupled to each other via communication channels other than the network 304, which for example, include one of the possible networks described with respect to the network 304 above. For example, two remote devices located in physical proximity may communicate with each other via a local network or a peer-to-peer network, instead of the network 304. According to some embodiments, deploying or executing a workflow on the remote devices includes executing services on different remote devices or different remote service provide Workflow-Deployment Operation Referring now to FIG. 4, a flow diagram illustrating a flow or a process or a method 400 for facilitating generation, deployment and/or execution of a workflow is shown. For convenience, the flow 400 is described with reference to the system 300 of FIG. 3, for example, the host-application server 324, and more particularly the workflow-application software 338. The flow 400, however, is carried out using other architectures as well.

The flow 400 starts at termination block 402, whereupon the user device 302 executes the GUI software 110 to form the GUI and render the display screen 124. After termination block 402, the flow 400 transitions and proceeds to process block 406, at which the workflow-application software 338 obtains the workflow record 114 including the network configuration settings, or the network setting configurations are received separately from the workflow record 114, for example, from the GUI software 110.

As shown in process block 406, the workflow-application software 338 obtains the workflow record 114 from the GUI software 110. To do this, the workflow-application software 338 receives, via the network 304, the workflow record 114 and included or separate network setting configurations, in response to the dispatch caused by manipulation of the GUI or, alternatively, caused by the synchronization and/or replication routines, such as routines triggered by user-device software 322, among others. In some embodiments, the GUI software 110 dispatches the workflow record 114 to the host-application server 324 over the network 304, in accordance with the process block 208 of the method 200 of FIG. 2. The workflow record 114 includes network settings associated with the tasks or the workflow. Further, the GUI software 110 and the workflow-application software 338 employ any of the suitable information exchange mechanisms to perform the dispatch and the reception of the workflow record 114 at the host 324. After process block 406, the flow 400 transitions to optional process block 408 or to process block 410.

As shown in optional process block 408, the workflow-application software 338 generates the workflow-executable code as a function of the workflow record 114. The workflow-application software 338 does this as follows.

The workflow-application software 338 parses the information from the workflow record 114. The parsed information includes the task and/or sequence parameters from the workflow record 114 and the parsed network setting configuration from the workflow record.

The workflow-application software 338 inspects the parsed information to determine which of the libraries 340 and the network setting libraries 341 matches the parsed information. This includes, for example, inspecting the task parameters to determine the tasks included in the workflow (e.g., by inspecting the indication of the task's function in each task parameters), and inspecting the network setting configurations to determine the network settings which correspond to the tasks included in the workflow.

Additionally, the workflow-application software 338 sequences the tasks in accordance with sequencing reflected in the parsed information. To carry this out, the workflow-application software 338 first culls the sequence parameters from the parsed information so as to obtain the sequencing. Then, the workflow-application software 338 arranges the parsed-code sets according to the sequencing so that the tasks are performed in the sequence defined by the workflow (as represented by the graphical workflow 134). Alternatively, the workflow-application software 338 arranges or rearranges, dynamically and/or via user interaction, the tasks in an order that is different from the sequence defined by the sequencing. The workflow-application software 338 does this, as noted above, to obtain an optimally-efficient execution sequence and/or to handle branching, to handle errors, etc.

In addition, the workflow-application software 338 searches through the libraries 340 and the network setting libraries 341 to determine the libraries that match (e.g., have patterns that are consistent with, the same as and/or substantially the same as) the task and/or sequence parameters and the network setting configurations ("matching libraries"). After locating the matching libraries, the code generator combines the parsed information with the matching libraries so as to form parsed-code sets. The code generator may, for example, form each of the parse-code sets by applying one task's parameters to the matching libraries that correspond to such task. This includes, for example, incorporating the criteria specified in the task and/or sequence parameters into the code of the matching libraries, and incorporating the criterion specified in network setting configurations into the specification of matching libraries. In addition, the code generator configures the parse-code sets or includes binding libraries to link together the parsed-code sets so that appropriate portions of the task and/or sequence parameters transfer between adjacent parsed-code sets. Once linked, the parsed-code sets form the workflow-executable code.

The workflow-application software 338 compiles the workflow-executable code to ready it for execution. Alternatively, the workflow-application software 338 might not compile the workflow-executable code until runtime or at all.

After process block 408, the flow 400 transitions to process block 410. As shown in process block 410, the workflow-application software 338 obtains the execution command from the GUI software 110 via the network 304. In some embodiments, the GUI software 110 issues the execution command to a target device, for example the host-application server 324 in accordance with the process block 210 of the method 200 of FIG. 2. The GUI software 110 issues the execution command in response to a user manipulation of the GUI, or other triggering mechanisms, such as synchronization and/or replication routines, or triggering initiated by application software on the user device. The GUI software 110 and the workflow-application software 338 employ any of the suitable information exchange mechanisms to perform the dispatch and the reception of the execution command. As noted above, the execution command is received some time after receiving the workflow record 114 or, alternatively, at or substantially at the same time as the workflow record 114. After process block 410, the flow 400 transitions to process block 411.

Figure 4:
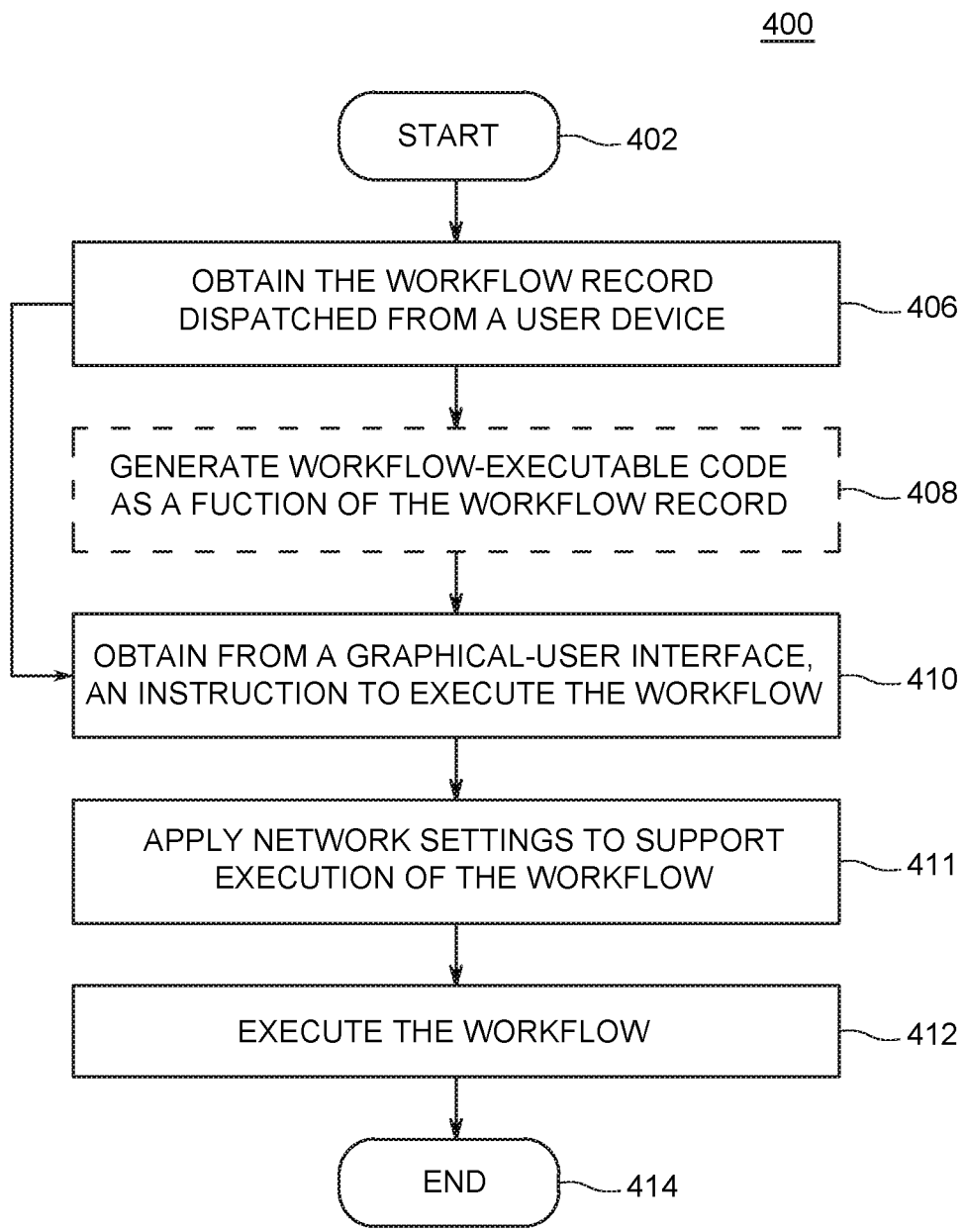
FIG. 4 is a flow diagram illustrating a flow for facilitating a generation, deployment and/or execution of a workflow over a network.

As shown in process block 411, the workflow-deployment software 338 applies the network setting configurations to various devices to which the workflow pertains. Applying correct network setting configurations enables connectivity between the various remote devices (e.g. servers of providers of remote services) to which the workflow pertains. The connectivity between the remote devices is enabled by a network, for example the network 304, for execution of the tasks of the workflow on the various devices. In some embodiments, the network settings are defined by a user using the user device. In some embodiments, the user manually enters the network setting information via a graphical user interface on the user device. In some embodiments, the network settings are obtained from a profile stored on the network and communicably coupled to either the user device, the host or both. The profile is stored in a profile database, and the profiles comprise network settings, which are either entered manually by the user (for example using a communicably coupled graphical user interface to the profile database), or obtained from a pre-defined database (for example, provided by a manufacturer of remote devices, or otherwise available). In this manner, the network settings may be updated at any time by a user, or be otherwise updated (e.g. by updating the profile database) to reflect a change in the configuration of remote devices (e.g. addition and/or deletion of edge or gateway devices, change in connectivity modes or other network related changes), in an instantaneous manner. While the process block 411 is depicted in FIG. 4 as being implemented after process block 410 in which instruction to execute the workflow is received, the process block 411 is implemented before the process block 410, and well ahead of execution of the workflow. After process block 411, the flow 400 transitions to process block 412.

As shown in process block 412, the workflow-deployment module executes the workflow. Responsive to the execution command, the workflow-application software 338 directly interprets the workflow record 114 so as to perform the workflow.

If not directly interpreted, then the workflow-application software 338 indicates to the workflow-deployment module that it received the execution command. Alternatively, the workflow-application software 338 passes the execution command to the workflow-deployment module to cause the workflow-deployment module to execute the workflow. The workflow-deployment module does so in response to the execution command.

When the execution command is received at the workflow-application software 338 prior to generating of the workflow-executable code, the workflow-application software 338 and/or the workflow-deployment module wait for the generation of the workflow-executable code to complete. Thereafter, the workflow-application software 338 indicates to the workflow-deployment module to perform execution the workflow-executable code. The workflow-deployment module executes the workflow-executable code at any time after generation of the workflow-executable code and receiving the execution command.

The workflow-application software 338 executes the workflow (via direct interpretation or the workflow-executable code) in a test mode or a production mode. In the test mode, the workflow-application software 338 develops one or more tests to test the workflow, and execute the workflow against the test for evaluation. When executing the workflow against the test, the input information mimics the input information for the production mode. In the production mode, the workflow-application software 338 executes the workflow using the input information for the production mode.

To facilitate executing the workflow (via direct interpretation or the workflow-executable code), the workflow-application software 338 provisions the host-application server 324 (e.g., by provisioning one or more modules of the workflow-application software 338 and/or the application-server software 336) for the tasks to receive service. The workflow-application software 338 provisions the host-application server 324 as a function of each task's functionality and criteria. Examples of the tasks and associated functionality and criteria are described in more detail with respect to FIGS. 5 and 6.

After the process block 412, the flow 400 transitions to termination block 414, at which point the flow 400 terminates. Alternatively, the flow 400 is repeated periodically, in continuous fashion, or upon being triggered as a result of a condition, such as a command or trigger. As another alternative, the process block 410 is repeated periodically, in continuous fashion, or upon being triggered as a result of a condition, such as additional execution commands, so as to execute the workflow. As yet another alternative, the process block 412 is repeated periodically (e.g., on a given schedule or other basis), in continuous fashion, or upon being triggered as a result of a condition so as to re-execute the workflow. Additionally, an assessment is made if a change in network settings is required, e.g. by virtue of a change in the tasks, sequencing, or failure or upgrade of the devices, and if it is determined that a change is required, the process 411 is repeated periodically, in continuous fashion, or upon being triggered as a result of a condition, such as additional execution commands, so as to support execution or re-execution of the workflow with the appropriate network settings.

Alternative System Architecture Example

Figure 5:
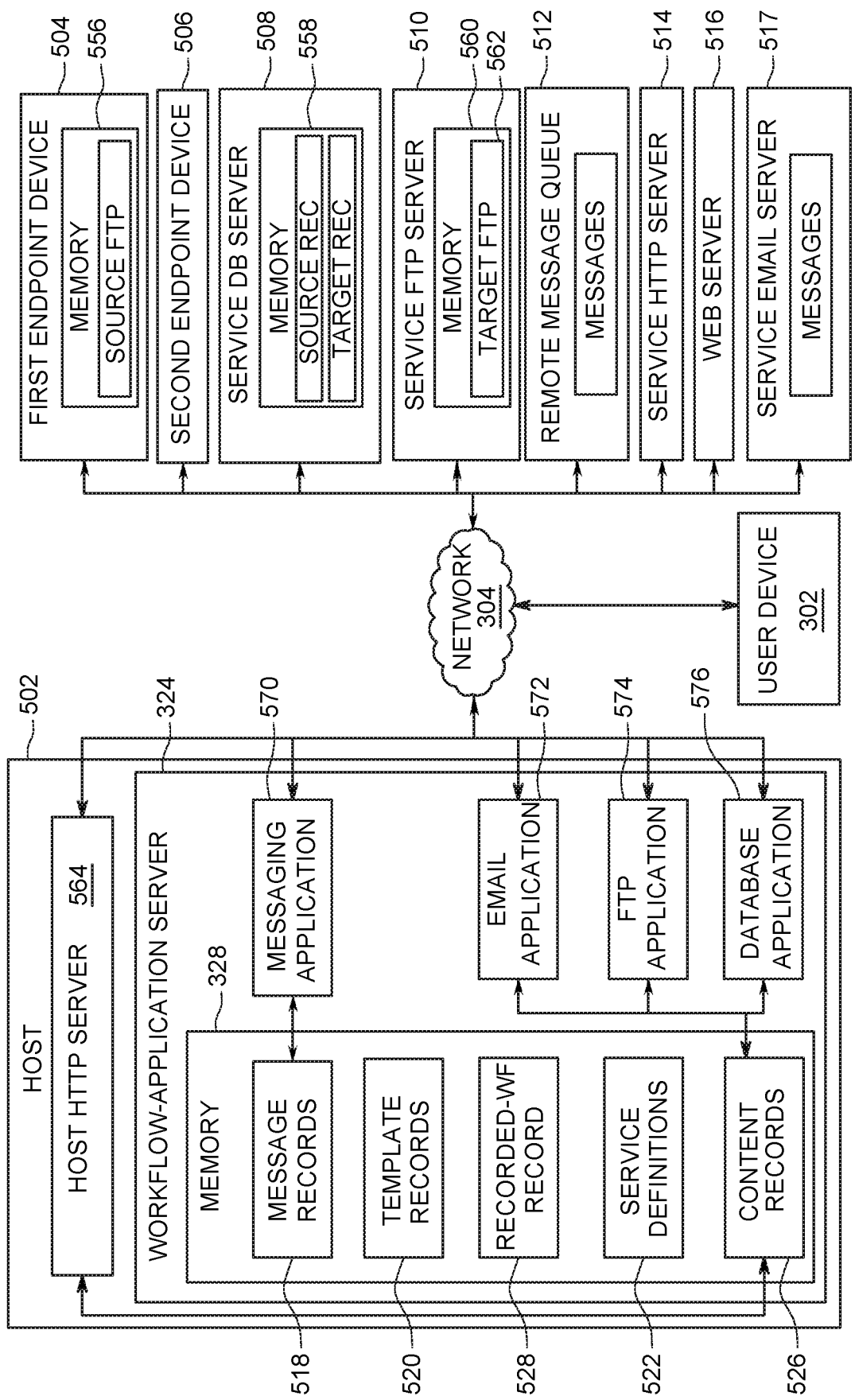
FIG. 5 is a block diagram illustrating a another system for generating, deploying and/or executing a workflow over a network.

FIG. 5 is a block diagram illustrating a system 500 for generating, deploying and/or executing a workflow. The system 500 is similar to the system 300 of FIG. 3, except as described herein. The system 500 includes the user device 302, a host device ("host") 502, and remote devices including a first endpoint device 504, a second endpoint device 506, a service-database server 508, a service-FTP server 510, a remote-message store 512, a service-HTTP server 514, a web server 516 and a service-email server 517; each of which is communicatively coupled to another via the network 304.

Each of the first endpoint device 504, second endpoint device 506, service-database server 508, service-FTP server 510, remote-message store 512, service-HTTP server 514, web server 516 and the service-email server 517 (collectively "remote devices", for example, similar to the remote devices 350 of FIG. 3) is any processor-based platform that operates on any suitable operating system, such as Microsoft® Windows®, Linux, UNIX, Symbian, among several others; and that is capable of executing software. Each of the remote devices 504-517 and includes a large number of elements; most of which are not shown in FIG. 5 for simplicity of exposition.

The elements of each of the remote devices 504-517 are formed in a single unitary device and concentrated on a single server, client, peer or other type node. Alternatively, the remote devices 504-517 are formed from two or more separate devices, and as such, are distributed among a number of server, client, peer or other type nodes.

Like the host-application server 324, each of the remote devices 504-517 are configured as a server, except such devices performs services different from the host-application server 324. The remote devices 504-517, however, need not be configured as servers, but rather, have the ability to service the host-application server 324. According to some embodiments, the workflow includes a first task executed on a first remote device (e.g. first endpoint device 504) resulting in a second task (same or different from the first task) executed on a second remote device (remote message queue 512). The second task is executed by enabling a connection between the first and the second remote devices. In some embodiments, the first task generates a call from the first device to the second device, requesting or sending data from or to the second device, respectively. In some embodiments, multiple other tasks are executed on multiple remote devices (e.g. described and others) and the tasks generates calls between such devices, or cause execution of additional tasks on one or more such remote devices. For enabling the execution of the workflow as intended, wherein tasks are executed on the remote devices, and data is exchanged between the remote devices and to/from the host, correct settings are needed for the communication channel (e.g. the network 304) connecting the remote devices and the host.

The first endpoint device 504 is configured as an application server, and includes memory ("first-endpoint memory") 556. The first-endpoint memory 556 stores source records obtained from the host-application server 324 using the File Transfer Protocol ("FTP").

The second endpoint device 506 is configured with a messaging application. The messaging application is capable of servicing requests and/or messages sent from the host-application server 324.

The service-database server 508 is configured as a database server, and is capable of servicing requests from the host-application server 324. The service-database server 508 includes a memory 558 for storing source database records transferred from the host-application server 324 along with target database records for transfer to the host-application server 324.

The service-FTP server 510 is configured as a FTP server, and is capable of servicing requests from the host-application server 324. The service-FTP server 510 includes a memory 560 for storing target-ftp files 562 for transfer to the host-application server 324.

The remote-message store 512 is configured to hold (temporarily, permanently or for some other period of time) one or more messages. These messages are retrieved and/or placed therein by one or more of the tasks of the workflow, another process (e.g., manual or automatic entry via a remote server, client, etc.), and/or another workflow.

In addition, the messages in the remote-message store 512 include or are populated with one or more target messages and/or one or more source messages. The target messages are messages that are exchanged between the remote-message store 512 and the content records 526 (via execution of the workflow). The source messages are messages that are exchanged between the remote-message store 512 and the content records 526 and/or messaging software 570 (as described in more detail below).

The service-http server 514 is/are configured as an HTTP server, and is/are capable of servicing HTTP requests sent from the host-application server 324. The web server 516 is/are configured to serve web services to the host-application server 324. The service-email server 517 is/are configured as an email server, and is/are capable of servicing email requests sent from the host-application server 324.

To not obscure the foregoing and following description with details and/or features of elements of the system 300 described above, some of these details and/or features are not repeated in the following description or shown in FIG. 5. Other details and/or features not described and/or not shown in FIG. 3 are presented.

The host 502 is similar to the host 306 of FIG. 3. Like the host 306, the host 502 includes the host-application server 324. The host 502 also includes a host-http server 564. The host-application server 324 couples to and transacts with the host-http server 564 while under the control of the workflow-application software 324 (e.g., under the control of the workflow-deployment module executing the workflow-executable code).

The host-http server 564 include any processor-based platform that operates on any suitable operating system, such as Microsoft® Windows®, Linux and/or Symbian; and that is capable of executing software. Like the host-application server 324, the host-http server 564 includes a large number of elements; most of which are not shown in FIG. 5 for simplicity of exposition.

The elements of the host-http server 564 are formed in a single unitary device and concentrated on a single server, client, peer or other type node. Alternatively, the elements of the host-http server 564 is/are formed from two or more separate devices, and as such, is/are distributed among a number of server, client, peer or other type node.

Although not shown, the host-http server 564 include a one or more processing units, memory, supports circuits, buses and other elements similar to the elements of the host-application server 324. The memory of the host-http server 564 include an operating system, which include and/or be embodied in various software and/or executable instructions or code for operating the host-http server 564. The operating system, when executed by its processors, provide a platform on which the host-http 564 server execute software applications for servicing HTTP requests that emanate from and/or terminate to the host-application server 324.

The host-http server 564 is configured as a server, and assists the host-application server 324 for accomplishing the execution of the workflow (as described in more detail below). The host-http server 564, however, needs not be configured as a server, but rather, be in any form that is operable to perform services for the host-application server 324. According to some embodiments, desired operational configuration(s) of the host-http server 564 are included in the network settings incorporated in the workflow.

The memory 328 also include various other software, such as messaging software 570, email software 572, FTP software 574, database software 574, etc., which is/are configured to facilitate requests of the host-application server 324. Each of the messaging software 570, email software 572, FTP software 574 and database software 574 operates as a client, peer and/or server.

The messaging software 570, when executed by the host-application server 324, provides an engine ("host-messaging engine") for exchanging one or more messages between the workflow-application software 338 and one or more of the remote devices, such as the remote-message store 512. The messaging engine is/are capable of exchanging the messages using any messaging protocol, such as Java Messaging Service ("JMS"), Session Initiation Protocol ("SIP"), SIP for Instant Messaging and Presence Leveraging Extensions ("SIMPLE"), Application Exchange ("APEX"), Presence and Instant Messaging Protocol ("PRIM"), Extensible Messaging and Presence Protocol ("XMPP"), Instant Messaging and Presence Service ("IMPS"), Internet Message Access Protocol ("IMAP") and the like.

The email software 572, when executed by the host-application server 324, provides the host-application server 324 with an engine ("host-email engine") for exchanging one or more email messages (with or without attachments) with the service-email server 517, and for transferring such email messages to and from the memory 328. The email engine is/are capable of interfacing with service-email server 518 according to any version of Simple Mail Transport Protocol ("SMTP"), Post Office Protocol ("POP"), Internet Message Access Protocol ("IMAP"), and other email service types.

The FTP software 574, when executed by the host-application server 324, provides the host-application server 324 with an engine ("host-FTP engine"). This FTP engine performs, in accordance with FTP, one or more transfers of files between one or more remote devices, such as the service-FTP server 510 and the memory 328.

The database software 576, when executed by the host-application server 324, provides the host-application server 324 with an interface ("host-database interface") for exchanging one or more database records from one or more remote devices, such as the service-database server 508, and for transferring such database records to and from the memory 328. The database software 576 is/are, for example, a client interface, such as a Java Database Connectivity ("JDBC") API, a Root Database Connectivity ("RDBC") API and the like. This client interface is/are operable to interface to any of an Oracle, DB2, Microsoft Access, Microsoft SQL Server, MySQL, 4th Dimension, FileMaker and the like database applications. In any case, the database software 576 is/are capable of interfacing with any number of databases including those formed using a Oracle, DB2, Microsoft Access, Microsoft SQL Server, MySQL, 4th Dimension, FileMaker, etc. database application.

The memory 328 includes, in addition to above, a number of records or other data structures (collectively, "records"). The records are used by and/or obtained for use by one or more of the tasks during an execution of the workflow. Examples of the records include messages records 518, template records 520, service-definition records 522, content records 526 and recorded-workflow records 528.

The message records 518 includes a repository ("message repository"), which is/are configured to hold one or more messages for retrieval by one or more of the tasks of the workflow. The message repository, for example, include one or more messages ("source messages") for transfer or retrieval from the host-application server 324 and/or one or more messages ("target messages") transfer to or retrieved by the host-application server 324.

The template records 520 include one or more conversion templates, schema templates, validation templates and/or message templates. As described in more detail below, the conversion templates are used by the tasks to convert input information from a native format into another format. To facilitate this, the conversion templates include one or more conversion filters. Examples of such conversion filters include a Microsoft® Excel® ("XLS") to XML filter, a delimited-field format to XML filter, a fixed-length field format to XML filter, a XML to XLS filter, an XML to a delimited-field format filter, a XML to a fixed-length field filter, etc.

The schema templates is/are used by one or more of the tasks of the workflow for identifying, evaluating and/or validating whether certain input information or results output from such tasks conform to one or more schemas and/or one or more semantic protocols. Examples of the schemas and/or semantic protocols include: XML; Financial Information eXchange ("FIX") protocol; customized versions of the FIX protocol, standards promulgated by the Society for Worldwide Interbank Financial Telecommunication SCRL ("SWIFT"); Financial products Markup Language ("FpML") protocol; Simple Object Access Protocol or Service Oriented Architecture Protocol (collectively, "SOAP"); and the like.

In addition, the validation templates (as described in more detail below) include one or more expressions and/or one or more mappings that is/are used by one or more of the tasks for evaluation of correctness and/or appropriateness of content input into such tasks. The expressions and/or mappings is/are used to create a series of rules that form a function for determining if the content input into the tasks is valid (e.g., the content conforms to expected criteria).

The message templates are configured as stencil-type templates (e.g., mail merge templates), which is/are used by one or more of the tasks for parsing the input information. The message templates include one or more entries into which the input information is/are parsed. The entries are also populated with expressions (e.g., formulas) that are evaluated using the input information. The message templates are used by one or more of the tasks to programmatically generate any number of records. For example, the message templates are used by the tasks to generate web pages, company newsletters and the like.

The content records 526 include content for input into the task; results generated from execution of the tasks; one or more expressions (e.g., formulas, procedures, rules, etc.) for evaluation by one or more of the tasks; the task parameters; one or more variables for use with the expressions and/or the task parameters; email records; and other information used, processed and/or stored by the tasks, including network settings required for executing the tasks of the workflow. The network settings are incorporated as a network setting record in the content record 526. The network setting record includes network setting configurations related to task and/or sequencing parameters of the workflow. In some embodiments (not shown), the network setting record is/are implemented separately from the content record 526 while preserving similar functionality.

Further, each of the email records include (i) a first field that is/are populated with an email address assigned to or otherwise associated with a sender of an email message, (ii) a second field that is/are populated with an email address assigned to or otherwise associated with a recipient of the email message, (iii) a third field that is/are populated with a subject of the email message, (iv) a fourth field that is/are populated with a body of the email message, and/or (v) information for retrieving or otherwise obtaining any attachment to the email message, if any.

The recorded-workflow records 528 include one or more records ("recorded-workflow records") for accomplishing a previously recorded workflow ("recorded workflow"). These recorded-workflow records include information for accessing the content records 526 so as to (i) obtain input information for execution of the recorded workflow, and/or (ii) store in the content records 526 any results from execution of the recorded workflow.

GUI Display Screen Example

Figure 6:
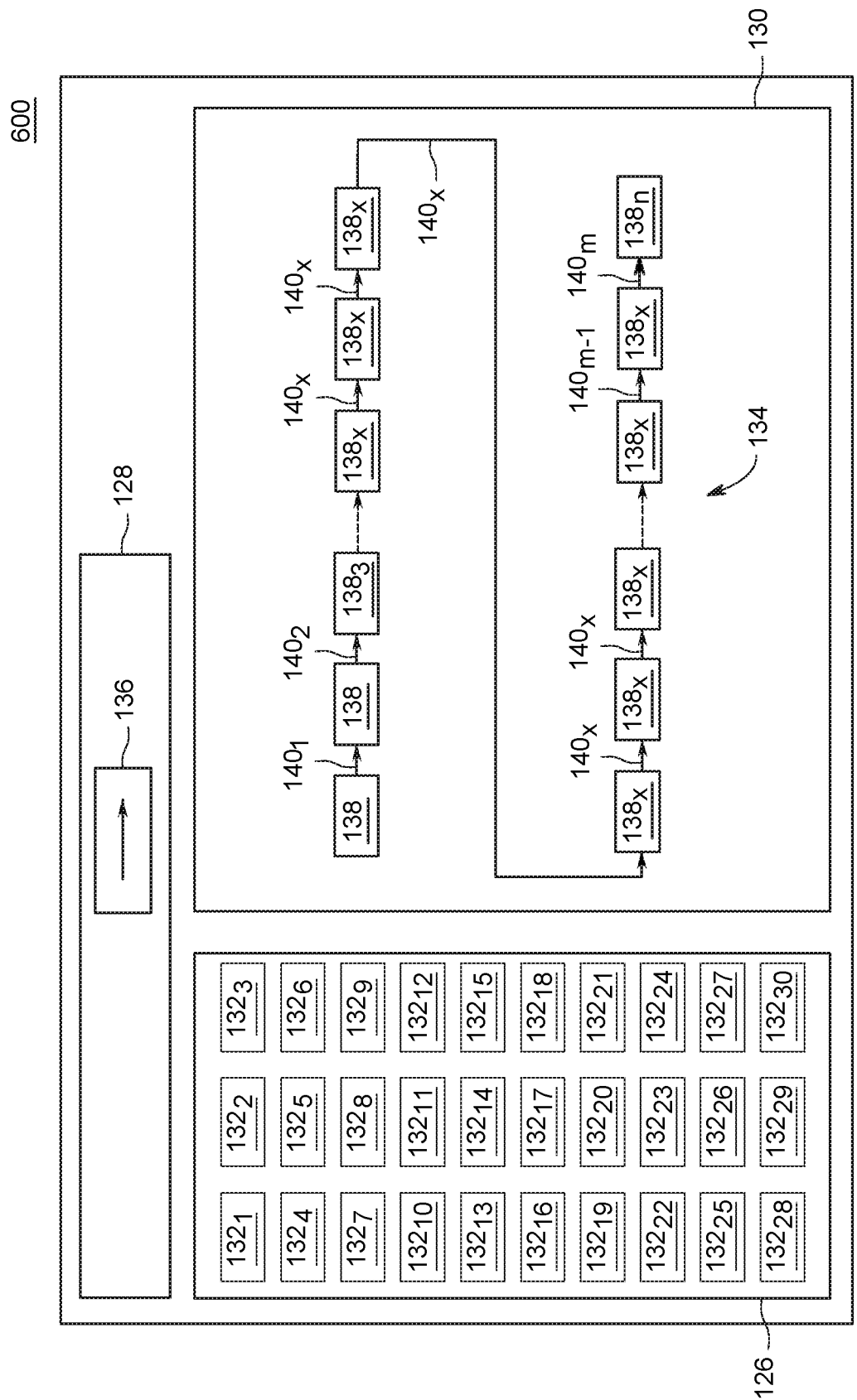
FIG. 6 is a graphical diagram illustrating an example of a display screen of a graphical-user interface for use with facilitating a generation, deployment and/or execution of a workflow over a network.

FIG. 6 is a graphical diagram illustrating an example of a display screen 600 of a graphical-user interface. The display screen 600 is similar to the display screen 124 of FIG. 5, except as described herein. For convenience, the display screen 600 is described with reference to the system 500 of FIG. 5. The display screen 600, however, is/are rendered using other architectures as well.

The display screen 600 includes the widget pane 126, the widget toolbar 128 and the workflow pane 130. The widget pane 126 includes a start widget $132_1$, a stop widget $132_2$, a display widget $132_3$, a conditional-statement widget $132_4$, a parse-template widget $132_5$, an expression widget $132_6$, a send-email widget $132_7$, a get-ftp widget $132_8$, a send-ftp widget $132_9$, a get-dB widget $132_{10}$, a send-dB widget $132_{11}$, a http-listen widget $132_{12}$, a http-send widget $132_{13}$, a http-respond widget $132_{14}$, a get-MQ widget $132_{15}$, a send-MQ widget $132_{16}$, a web-service widget $132_{17}$, a transform widget $132_{18}$, a convert widget $132_{19}$, a semantic-protocol widget $132_{20}$, a delete widget $132_{21}$, a validate widget $132_{22}$, a tcp-listen widget $132_{23}$, a tcp-get widget $132_{24}$, a tcp-send widget $132_{25}$, a wait widget $132_{26}$, a get-email widget $132_{27}$, a copy widget $132_{28}$, an iterate widget $132_{29}$, and a launch-workflow widget $132_{30}$.

These widgets $132_1$-$132_{30}$ correspond to start, stop, display, conditional-statement, parse-template, expression, send-email, get-ftp, send-ftp, get-dB, send-dB, http-listen, http-send, http-respond, get-MQ, send-MQ, web-service, transform, convert, semantic-protocol, delete, validate, tcp-listen, tcp-get, tcp-send, wait, get-email, copy, iterate and launch-workflow tasks (collectively, "tasks") and are associated with workflow-operation records $116_1$-$116_{30}$, respectively. The workflow-operation records $116_1$-$116_{30}$, in turn, include the respective task parameters.

As described above, the GUI software 110 obtain, for each instance of the widgets $132_1$-$132_{30}$ in the graphical workflow 134, the corresponding task parameters via manipulation of the GUI by the I/O device 106 (e.g., entered via a keyboard). The workflow-application software 338 obtains such task parameters from the workflow record 114 dispatched from the GUI software 110, and uses these task parameters to execute the workflow. In some embodiments, the workflow-application software 338 also receive the network setting configurations associated with the workflow from the GUI software 110, for example, in the manner described above. The following describes, with respect to each of the widgets $132_1$-$132_{30}$, (i) the task that the workflow-application software 338 execute if such task were to be included in the workflow (and graphical workflow 134), and (ii) examples of the task parameters with respect to executing the workflow and provisioning the host 502 for executing the workflow.

Start Task Example

The start task, as represented by the start widget $132_1$, functions as a starting point for executing the workflow, and causes host-application server 324 to begin accomplishing the tasks of the workflow. Typically, the workflow includes only one start task.

Some of start task parameters is/are common to other tasks and/or the workflow as a whole. The common start task parameters include a workflow-name entry, a workflow-description entry, a workflow-author entry, a workflow-version entry and a log-level entry.

The workflow-name entry includes a name given to the workflow to identify the workflow. The workflow-description entry is/are populated with a description given of the workflow to describe, for example, a purpose for the workflow. The workflow-author entry is/are populated with a name of an author that authors the workflow. The workflow-version entry is/are populated with an indicator (e.g., a number) to indicate a version assigned to the workflow. Each of the workflow-name, workflow-description, workflow-author and workflow-version entries is/are expressed as a character or a string of characters.

The log-level entry is/are populated with an indicator that indicates a level (e.g., an error, warning or debug level) for triggering a logging of events during execution of the workflow. The log-level entry is/are expressed as one of a given number of settings.

For each of the following tasks, the task parameters include respective name entries and description entries. Except as otherwise described, each of the name entries include a name assigned to the corresponding task so to identify a particular instance of it, and is/are expressed as a character, a string of characters, a variable, an expression, etc.

In addition, each of the description entries includes a description assigned to the corresponding task for describing a particular instance of the corresponding task. These description entries are expressed as a character, a string of characters, a variable, an expression, etc. Other task parameters are described in more detail below.

Stop Task Example

The stop task, as represented by the stop widget $132_2$, functions as an ending point or termination of the workflow, and causes the host-application server 324 to terminate the workflow. The stop task's definitions include termination parameters. The termination parameters include a setting for indicating either a normal or abnormal termination of the workflow ("termination setting"), and a flag for indicating that the any input information that undergoes processing by the workflow is considered either fully processed by the workflow or not.

The workflow includes more than one stop task, when, for example, the workflow includes more than one alternative path of execution or "branch" of tasks ("workflow branches"). By way of example, the workflow branches include first and second branches. The first branch terminates with a first stop task, and the second branch terminates with a second stop task. In this case, the GUI software 110 configure the first and second stop task parameters by setting the termination settings of both the first and second stop tasks to normal terminations so as to cause the workflow to terminate respective workflow branches only. When so configured, the GUI software 110 sets the flag so as to indicate that the input information that undergoes processing by the tasks of the first and second branches are considered fully processed.

Alternatively, the GUI software 110 configure either or both of the first and second stop task parameters by setting the termination settings to abnormal termination so as to cause the workflow to terminate upon performing either the first or second stop tasks. When so configured, the GUI software 110 sets the flag to indicate that the input information undergoing processing by the workflow are not considered fully processed.

Display Task Example

The display task, as represented by the display widget $132_3$, causes the host-application server 324 to send, via the host-messaging engine, a message to the message records 518 for retrieval and/or to the second endpoint device 506. This message in the message records 518 is/are retrieved by other tasks, another workflow, the user device 302, the host 306, and/or the second endpoint device 506, etc.

Examples of display task parameters include a message-queue entry and a message entry. The message-queue entry include information for accessing and/or communicating with the message records 518 and/or the second endpoint device 506 to deliver the message. This information is/are, for example, a name or address assigned to or otherwise associated with message records 518 and/or the second endpoint device 506. Alternatively, the information is/are a reference, pointer, uniform-resource identifier ('URI") or other indicator to a location of the message records 518 in the memory 328 and/or to name or address of the second endpoint device 506.

The message entry include (i) a first field that is/are populated with a subject of the message ("the message subject") and (ii) a second field that is/are populated with a body or content of the message ("the message body"). The message-queue and message entries is/are expressed as is/are expressed as characters, strings of characters, expressions, templates, variables and/or the like. In addition, the message body is/are specified using the messaging template noted above.

Conditional-Statement Task Example

The conditional-statement task, as represented by conditional-statement widget $132_4$, functions as decision point for causing the host-application server 324 to execute one or more of the workflow branches as a function of a conditional statement. The conditional-statement task parameters include a conditional-expression entry.

The conditional-expression entry is/are populated with the conditional statement. The conditional statement is expressed as a logical expression, such as an if-then statement and/or a BOOLEAN expression, and specifies one or more of the workflow branches and/or tasks for execution upon an evaluation (e.g., a true or false determination) of the conditional statement.

Parse-Template Task Example

The parse-template task, as represented by the parse-template widget $132_5$, causes the host-application server 324 to select a template ("selected template") from the message templates, parse at least a portion of its input information with the selected template. To parse the input information, the host-application server 324 (i) populate the variables in the selected template with the input information that corresponds thereto, (ii) evaluate the expressions specified in the selected template so as to form a result, and (iii) output and/or store the result in the content records 526.

The parse-template task parameters include a template entry. The template entry is/are expressed is/are expressed as characters, strings of characters, expressions, templates, variables and/or the like.

The template entry includes information for retrieving or otherwise obtaining the selected template for parsing the input information. This information is/are, for example, a name assigned to or otherwise associated with the selected template. Alternatively, the information is/are a reference, pointer, URI or other indicator to a location of the selected template stored in the template records 520 on the memory 328.

Expression Task Example

The expression task, as represented by the expression widget $132_6$, cause the host-application server 324 to evaluate one or more of the expressions specified in the expression's task parameters, and store one or more results of the evaluation in the content records 526 for subsequent retrieval and/or analysis. The expression task causes the host-application server 324 to apply an order execution when the expression entry includes more than one expression. This order of execution is/are based on time of entry, order of entry, mathematical hierarchy, analytical hierarchy, arithmetical hierarchy, statistical analysis, etc.

Examples of expression task parameters include an expression entry and a result-location entry. The expression entry includes one or more expressions (e.g., formulas). The result-location entry include information for retrieving or otherwise obtaining from the content records 526 a previously stored result, and for storing a current result back to the content records 526. This information is/are, for example, a name assigned to or otherwise associated with the current results in the content records 526 and/or the previously stored result stored in the content records 526. Alternatively, the information for the result-location entry is/are a reference, pointer, URI or other indicator of a location (i) of the content records 526, (ii) of the previously stored result stored in the content record 526 and/or (iii) for storing the current result in the content records 526. The result-location entry is/are expressed as characters, strings of characters, expressions, templates, variables and/or the like.

Send-Email Task Example

The send-email task, as represented by the send-email widget $132_7$, causes the host-application server 324 to create an email message (with or without attachment) and transmit it, via the email software 572 and/or the service-email server 517, to at least one recipient, such the second endpoint device 506. Examples of send-email task parameters include an email-service-definition entry and an email entry.

The email-service-definition entry includes a reference to a previously configured service definition that identifies an email service ("email-service definition") that is/are used to perform the send-email task. The email-service definition includes a number of parameters ("email-service parameters"), which is/are stored on the memory 338 in service-definition records 522. The email-service parameters include information for configuring the email software 572 and/or the service-email server 517 to perform the send-email task. This information include, for example, URIs and/or other addresses of the email software 572 and/or the service-email server 517, protocols to be used for accomplishing the email service, and the like.

The email entry includes information for populating the email. This information is/are expressed as a character, sets of characters and/or variables. As an alternative, the information for the email entry is/are expressed as expressions; the evaluation of which determines the contents of the email. In either case, the information for the email entry include, for example, names assigned to or otherwise associated with one or more portions of the email, which is/are obtained from the email records stored in the content records 526. Alternatively, the information for the email entry is/are a reference, pointer, URI or other indicator to locations of the email records stored in the content records 526 the email.

Although the email-service definition and associated email-service parameters are described herein as being included in the service definition records 522, the service definition records 522 is/are dispensed with. If dispensed with, the send-email task parameters include information analogous to the email-service definition and associated email-service parameters for configuring the email service.

Get-FTP Task Example

The get-ftp task, as represented by the get-ftp widget $132_8$, cause the host-application server 324 to retrieve a file ("target-ftp file") from the service-FTP server 508 via the host-FTP engine, and store the target-ftp file to the memory 328. Examples of get-ftp task parameters include a get-ftp-service-definition entry, a target file entry, a destination-location entry, and a get-additional-files entry. The get-ftp-service-definition, target file, destination-location and get-additional-files entries is/are expressed as characters, strings of characters, expressions, templates, variables and/or the like.

The get-ftp-service-definition entry includes a reference to a previously configured service definition that identifies an FTP service that is/are used to perform the get-ftp task. This service definition ("FTP-service definition") includes a number of parameters, which is/are stored on the memory 338 in the service-definition record 522. These parameters ("FTP-service parameters") include information for configuring the FTP software 574 and/or the service-FTP server 510 to perform the get-ftp task. This information includes, for example, a name or address assigned to or otherwise associated with the service-FTP server 508; a setting for specifying a type of transfer mode (e.g., ASCII or binary) to be used; and the like.

The target file entry includes information for retrieving or otherwise obtaining the target-ftp file from the service-FTP server 508 using the FTP-service. This information includes a name or address assigned to or otherwise associated with the target-ftp file. Alternatively, the information for the target file entry is/are a reference, pointer, URI or other indicator to a location of the target-ftp file on the service-FTP memory 560.

The destination-location entry includes information for indicating where to store the target-ftp file on the memory 328. This information includes, for example, a reference, pointer, URI or other indicator to a location of the on the memory 328.

The get-additional-files entry includes a setting for specifying whether or not to retrieve more than one file from the service-FTP memory 560. Although the destination-location entry and get-additional-files entry are described herein as being included in the get-ftp task parameters, either or both of such entries (and the parameters included therein) is/are included as FTP-service parameters in the FTP-service definition instead of in the get-ftp task parameters. In such a case, the get-ftp task parameters optionally include parameters for overriding, modifying, adjusting or otherwise changing such FTP-service parameters. As another alternative, the information in or information analogous to the FTP-service definition and associated FTP-service parameters is/are included in the get-ftp task parameters instead of the service definition records 522.

Send-FTP Task Example

The send-ftp task, as represented by the send-ftp widget 132$_9$, cause the host-application server 324 to transfer a file ("source-ftp file") from memory 328 to the service-device memory 556 of the first-endpoint device 504 using the FTP software 574. Examples of send-ftp task parameters include a send-ftp-service-definition entry, a source file entry, a destination-location entry, and a send-additional-files entry.

The send-ftp-service-definition entry includes a reference to a previously configured FTP service definition that is/are used to perform the send-ftp task. This FTP-service definition includes a number of parameters, which is/are stored on the memory 338 in the service-definition record 522. These parameters ("FTP-service parameters") include information for configuring the FTP software 574 and/or the first-endpoint device 504 to perform the send-ftp task. This information include, for example, a name or address assigned to or otherwise associated with the FTP software 574 and/or the first-endpoint device 504; a setting for specifying a type of transfer mode (e.g., ASCII or binary) to be used; and the like.

The source file entry includes information for retrieving or otherwise obtaining the source-ftp file from the memory 328. This information includes a name or address assigned to or otherwise associated with the source-ftp file. Alternatively, the information for the source file entry is/are a reference, pointer, URI or other indicator to a location of the source-ftp file on the memory 328.

The destination-location entry includes information for storing the source-ftp file on the service-device memory 556. This information is/are, for example, a reference, pointer, URI or other indicator to a location of the service-device memory 556 and/or the first-endpoint device 504.

The send-additional-files entry includes a setting for specifying whether or not to transfer more than one file on the service-device memory 556 of first-endpoint device 504. The send-ftp-service-definition, source file, destination-location and send-additional-files entries is/are expressed as characters, strings of characters, expressions, templates, variables and/or the like.

Although the destination-location entry and send-additional-files entry are described herein as being included in the send-ftp task parameters, either or both of such entries (and the parameters included therein) is/are included as FTP-service parameters in the FTP-service definition instead of in the send-ftp task parameters. In such case, the send-ftp task parameters optionally include parameters for overriding, modifying, adjusting or otherwise changing such FTP-service parameters. As another alternative, the information in or information analogous to the FTP-service definition and associated FTP-service parameters is/are included in the get-ftp task parameters instead of the service definition records 522.

Get-Database Task Example

The get-dB task, as represented by the get-dB widget 132$_{10}$, causes the host-application server 324 to retrieve or otherwise obtain target data from the target records in memory 558 of the service-database server 508, and to store such target data in the content record 526. The get-dB task causes such transfer of the target data responsive to the host-application server 324 submitting a query (e.g., one or more SQL commands) to the service-database server 508.

Examples of get-dB task parameters include a get-dB-service-definition entry, a data request entry and a destination-location entry. The get-dB-service-definition, data request and destination-location entries is/are expressed as characters, strings of characters, expressions, templates, variables and/or the like.

The get-dB-service-definition entry includes a reference to a previously configured service definition that identifies a database service that is/are used to perform the get-dB task ("dB-service definition"). This dB-service definition includes a number of parameters, which is/are stored on the memory 338 in the service-definition record 522. These parameters ("dB-service parameters") include information for configuring the database software 576 and/or the service-database server 508 to perform the get-dB task. This information includes, for example, names or addresses assigned to or otherwise associated with the database software 576 and/or the service-database server 508; one or more settings for specifying at least one database management systems ("DBMS"), such as any of a Oracle, DB2, Microsoft Access, Microsoft SQL Server, Postgres, MySQL, 4th Dimension, FileMaker and Alpha Five DBMS, for querying the service-database server 508; and the like.

The information for the dB-service parameters also include a name, address, reference, pointer, URI or other indicator to a location of the source records in memory 558 of the service-dB server 508. The information for the dB-service parameters further include a reference to a template or schema into which the target data is/are parsed, transformed, converted and/or validated before transfer to the content records 526.

This template or schema, for example, defines an XML sequence of elements. An example of such elements is as follows:

```
<rowset>
    <row>
        <Column1Name></Column1Name>
        <Column2Name></Column2Name>
        ...
        <ColumnNName></ColumnNName>
    </row>
</rowset>
```

The <row> pair demarcates <column$_1$-column$_n$> pairs, and corresponds, for example, to a row of the source data stored in the source-database records or a row of the target data stored in the service-database server 508. The <column$_1$-column$_n$> pairs demarcate a respective number of placeholders. These placeholders are parsed with the content that corresponds to respective columns of the row of source data.

Although the foregoing example includes only one <row> pair, the XML sequence, however, include more than one <row> pair. These additional <row> pairs demarcate one or more additional <column> pairs. In addition, the foregoing example includes more than one column pair, namely, <column$_1$-column$_n$>. The XML sequence, however, include only one column pair.

The data request entry include information for causing the database software 576 to generate a query for execution against the source records in memory 558 of the service-database server 508 so as to obtain the target data from the target records in memory 558 of the service-database server 508. The destination-location entry includes information for storing the target data in the variables records 526. This information includes a name, address, reference, pointer, URI or other indicator to a location of the content records 526.

Although the destination-location entry is described herein as being included in the get-dB task parameters, this entry (and the parameters included therein) is/are included as dB-service parameters in the dB-service definition instead of in the get-dB task parameters. In such case, the get-dB task parameters optionally include parameters for overriding, modifying, adjusting or otherwise changing such dB-service parameters. As another alternative, the information in or information analogous to the dB-service definition and associated dB-service parameters is/are included in the get-dB task parameters instead of the service definition records 522.

Send-Database Task Example

The send-dB task, as represented by the send-dB widget 132$_{11}$, cause the host-application server 324 to perform one or more operations with the service database server 508 so as to insert, update, delete, retrieve or otherwise modify data or a schema on the service-database server 508. For example, the send-dB task causes the host-application server 324 to transfer source data obtained from the content records 526 to the service-database server 508 via the database software 576. Alternatively, the send-dB task cause the database software 576 to (i) execute a query against the content records 526 to obtain the source data, and (ii) transfer the source data to the service-database server 508.

Examples of send-dB task parameters include a send-dB-service-definition entry and a database operation entry. Each of the send-dB-service-definition and database operation entry is/are expressed as a character, a string of characters, an expression, a template and/or a variable.

The send-dB-service-definition entry includes a reference to a previously configured dB-service definition for accomplishing the send-dB task. This information include, for example, names or addresses assigned to or otherwise associated with the database software 576 and/or the service-database server 508; one or more settings for specifying at least one DBMS for interfacing with the service-database server 508; one or more settings for specifying at least one DBMS for querying the content records 526; and the like.

The information for the dB-service parameters also include a name, address, reference, pointer, URI or other indicator to a location in the target records of memory 558 of the service-database server 508 for storing the source data. The information for the dB-service parameters also include a reference to a template or schema (e.g., an XML sequence) into which the source data is/are parsed before transfer to the target records of memory 558 of the service-database server 508.

The database operation entry include information inserting, updating, deleting, retrieving or otherwise modifying the data and/or schema of the service-database server 508 (e.g., information for causing the database software 576 to generate a query for execution by the database software 576. Alternatively, the database operation entry include a name, address, reference, pointer, URI or other indicator to a location of the source data in the content records 526.

To facilitate providing the source data to the service-database server 508, the send-dB task causes the host-application server 324 to parse the source data in accordance with semantics, such as replace-type semantics. For example, the send-dB task cause the host-application server 324 to update <row> elements of the target data in memory 558 of the service-database server 508 with the source data that corresponds to such <row> elements. On the other hand, the send-dB task causes the host-application server 324 to insert <row> elements for such source data when the target data in memory 558 of the service-database server 508 does not include such <row> elements.

As an alternative, the information in or information analogous to the dB-service definition and associated dB-service parameters is/are included in the send-dB task parameters instead of the service definition records 522.

HTTP-Listen Task Example

The http-listen task, as represented by the http-listen widget 132$_{12}$, cause the host-HTTP server 564 to (i) listen for a given service-HTTP request from one or more applications of a service device, such as a web browser of the second endpoint device 506; (ii) establish a communication between the host-HTTP server 564 and the application of the second endpoint device 506 responsive to the given service-HTTP request, and (iii) cause the host-application server 324 to execute a given set of the tasks ("given-task set") selected from one or more sets of the tasks queued for execution ("queued-task sets").

The http-listen task also causes the host-application server 324 to extract information from the given service-HTTP request and/or the communication between the host-HTTP server 564 and the application of the second endpoint device 506 (collectively "HTTP-connection details"). The http-listen task uses the HTTP-connection details for selecting the given-task set from the queued-task sets and for accomplishing the given-task set.

Examples of the http-listen task parameters include an http-listen-service-definition entry and a destination-location entry. The http-listen-service-definition entry and the destination-location entry is/are expressed as characters, strings of characters, expressions, templates, variables and/or the like.

The http-listen-service-definition entry includes a reference to a previously configured service definition that identifies a service that is/are used to perform the http-listen task ("HTTP-service definition"). This HTTP-service definition includes a number of parameters, which is/are stored on the memory 338 in the service-definition record 522. These parameters ("HTTP-service parameters") include information designating an internet protocol ("IP") address and a port of host-HTTP server 564 for listening for the request. This information includes, for example, a URI associated with the domain of the service-HTTP server 514. This URI is/are full or partial. The URI is/are prefixed with the IP and/or name of the service-HTTP server 514 that is assigned by a domain-name server ("DNS"). The information for the http-service definition also include (i) one or more IP addresses associated with the service-HTTP server 514; and (ii) information for designating the applications and/or service devices that the http-listen task listens for.

The destination-location entry includes information for storing the HTTP-connection details in the content records 526. This information includes, for example, a name, address, reference, pointer, URI or other indicator to a location of the content records 526.

HTTP-Send Task Example

The http-send task, as represented by the http-send widget 132$_{13}$, causes the host-application server 324 to (i) send a given HTTP request to the service-HTTP server 514, (ii) establish a communication between the host-HTTP server 564 and the service-HTTP server 514, (iii) receive a HTTP reply from the service-HTTP server 514, and (iv) store content associated with the HTTP reply in the content records 526. Examples of the http-send task parameters include an http-send-service-definition entry and an http-send-operation entry. Each of the http-send-service-definition and http-send-operation entries is/are expressed as a character, string of characters, expression, template, variable and/or the like.

The http-send-service-definition entry includes a reference to a previously configured HTTP-service definition. This HTTP-service definition includes a number of HTTP-service parameters, which is/are stored on the memory 338 in the service-definition record 522. As an alternative, the information in or information analogous to the HTTP-service definition and associated parameters ("HTTP-service parameters") is/are included in the http-send task parameters instead of the service definition records 522. The HTTP-service parameters include information designating an IP address and/or a port of the service-HTTP server 514 configured to receive the given host-HTTP request.

The http-send-operation entry include (i) a URL (full or partial) associated with the domain of the service-HTTP server 514, which is/are prefixed with the IP and/or name of the service-HTTP server 514 that is assigned by a DNS; (ii) information for indicating to the service-HTTP server 514 a method of transfer, e.g., a HTTP GET, POST and/or PUT; (iii) information for retrieving and/or obtaining from the content records 526 source data (e.g., variables, expressions and/or templates) for generating the given HTTP request; (iv) information for storing the content associated with the communication in the message channels for subsequent retrieval; and (v) information for storing the content associated with the HTTP reply in the content records 526.

Although the http-send-operation entry is described herein as being included in the HTTP-send task parameters, this entry (and the parameters included therein) is/are included as HTTP-service parameters in the HTTP-service definition instead of in the HTTP-send task parameters. In such case, the HTTP-send task parameters optionally include parameters for overriding, modifying, adjusting or otherwise changing such HTTP-service parameters. As another alternative, the information in or information analogous to the HTTP-service definition and associated HTTP-service parameters is/are included in the HTTP-send task parameters instead of the service definition records 522.

HTTP-Respond Task Example

The http-respond task, as represented by the http-respond widget 132$_{14}$, cause the host-HTTP server 564 to issue a given host-HTTP reply to a given service-HTTP request issued from one or more applications of a service device, such as the web browser of the second endpoint device 506. This include causing the host-HTTP server 564 to (i) obtain content from the content records 526 for inclusion in the given host-HTTP reply, and (ii) send the content to the service-HTTP server 514. The content included in the given host-HTTP reply is/are selected from information stored in the content records 526 or, alternatively, constructed from such information as a function of an expression, template, etc.

Examples of the http-respond task parameters include an http-connection-definition entry and a source file entry. Each of the http-connection-definition and source file entries is/are expressed as a character, a string of characters, an expression, a template and/or a variable.

The http-connection-definition entry includes a reference to HTTP-connection details stored on the memory 338 in the content records 526. The HTTP-connection details include, as noted above, information for designating an IP address and a port of the web browser of the second endpoint device 506 to receive the given host-HTTP reply.

The source file entry includes information for obtaining the content from the content records 526. This information includes a name or address assigned to or otherwise associated with the content in the content records 526. Alternatively, the information includes a reference, pointer, URI or other indicator to a location of the content in the content records 526.

Get-Message-Queue Task Example

The get-MQ task, as represented by the get-MQ widget 132$_{15}$, causes the host-application server 324 to retrieve and transfer a message ("target message") from the remote message queue 512 to the content records 526 via the messaging software 570. Examples of the get-MQ task parameters include a get-MQ-service-definition entry, a target-message entry and a destination-location entry. The get-MQ-service-definition, get-message and destination-location entries are expressed as characters, strings of characters, expressions, templates, variables and/or the like.

The get-MQ-service-definition entry includes a reference to a previously configured service definition that identifies a message-queue service that is/are used to perform the get-MQ task. This service definition ("MQ-service definition") includes a number of parameters, which is/are stored on the memory 338 in the service-definition record 522. These parameters ("MQ-service parameters") include information for configuring the messaging software 570 and/or the remote-message store 512 to perform the get-MQ task. This information include, for example, a URI associated with the domain of the remote-message store 512; and/or one or more IP addresses associated with the remote-message store 512.

The target message entry includes information for differentiating the target message from other messages in the remote-message store 512. This information includes, for example, terms for searching and monitoring the remote-message store 512 for the target message.

The destination-location entry includes information for storing the target message in the content records 526. This information includes, for example, a name, address, reference, pointer, URI or other indicator to a location of content records 526.

Although the destination-location entry is described herein as being included in the get-MQ task parameters, this entry (and the parameters included therein) is/are included as MQ-service parameters in the MQ-service definition instead of in the get-dB task parameters. In such case, the get-MQ task parameters optionally include parameters for overriding, modifying, adjusting or otherwise changing such MQ-service parameters.

As another alternative, the information in or information analogous to the MQ-service definition and associated MQ-service parameters is/are included in the get-MQ task parameters instead of the service definition records 522.

Send-Message-Queue Task Example

The send-MQ task, as represented by the send-MQ widget 132$_{16}$, cause the host-application server 324 to obtain content from the content records 526; populate one or more of the source messages with the content obtained from the content records 526; and transfer the source messages to the remote message queue 512, via the messaging software 570. The content obtained from the content records 526 is/are selected from information stored in the content records 526 or, alternatively, constructed from such information as a function of an expression, template, etc.

Examples of the send-MQ task parameters include a send-MQ-service-definition entry and a message entry. The send-MQ-service-definition entry and the message entry is/are expressed as characters, strings of characters, expressions, templates, variables and/or the like.

The send-MQ-service-definition entry includes a reference to a previously configured MQ-service definition that is/are used to perform the send-MQ task. This MQ-service definition includes a number of MQ-service parameters, which is/are stored on the memory 338 in the service-definition record 522. These MQ-service parameters include information for configuring the messaging software 570 and/or the remote message queue 512 to perform the send-MQ task. This information include, for example, the URI associated with the domain of the remote message queue 512, or alternatively, one or more IP addresses associated with the remote message queue 512.

The MQ-service parameters also include information for obtaining the content from the content records 526. This information includes a name or address assigned to or otherwise associated with information stored in the content records 526. Alternatively, the information includes a reference, pointer, URI or other indicator to a location of such information in the content records 526. In addition, the MQ-service parameters include terms and/or instructions for constructing the content from information stored in the content records 526.

The message entry includes (i) a first field that is/are populated with a subject of the message and (ii) a second field that is/are populated with a body of the message. The message entry includes other fields as well.

Although the MQ-service definition and associated MQ-service parameters are described herein as being included in the service definition records 522, the MQ-service definition and the parameters included therein is/are dispensed with. If dispensed with, the send-MQ task parameters include information for configuring the MQ service.

Web-Service Task Example

The web-service task, as represented by the web-service widget $132_{17}$, cause the host-application server 324 to (i) obtain content from the variables records 526, and (ii) transfer the content to trigger execution of a web service on the remote-web server 516. The web-service task also causes the host-application server 324 to store in one of the content records 526 any results returned from the web service. The content obtained from the content records 526 is/are selected from information stored in the content records 526 or, alternatively, constructed from such information as a function of an expression, template, etc.

Examples of the web-service task parameters include a web-service-definition entry and a content entry. The web-service-definition entry and content entry is/are expressed as characters, strings of characters, expressions, templates, variables and/or the like.

The web-service-definition entry includes a reference to a previously configured service definition that identifies a service for accomplishing the web-service task. This service definition ("web-service definition") includes a number of parameters, which is/are stored on the memory 338 in the service-definition record 522. These parameters ("web-service parameters") include information for configuring the host-application server 324 and/or the remote-web server 516 to perform the web-service task. The configuration information include, for example, information for accomplishing transfers of the input information between the host-application server 324 and other devices, such as the web server 516, such as IP addresses, parameters, type of data, key value pairs, posting of images, etc.

The web-service parameters also include information for selecting the web-service from a set of web services offered by the remote-web server 516; and/or information for designating a method of execution of the web-service. The web-service parameters further include information for storing the results, if any, in the content records 526. Such information includes a name, address, reference, pointer, URI or other indicator to a location in the content records 526.

The content entry includes the information for obtaining the content from the content records 526. This information includes a name or address assigned to or otherwise associated with the content in the content records 526. Alternatively, the information includes a reference, pointer, URI or other indicator to a location of the content in the content records 526.

Although the web-service definition and associated web-service parameters are described herein as being included in the service definition records 522, the web-service definition and the parameters included therein is/are dispensed with. If dispensed with, the web-service task parameters include information for configuring the web service.

Transform Task Example

The transform task, as represented by the transform widget $132_{18}$, cause the host-application server 324 to (i) obtain content from the content records 526, (ii) apply a transform against the content to yield results, and (iii) transfer the results to the content records 526. Examples of the transform task parameters include a transform entry, a content entry and a destination-location entry. The transform, content and destination-location entries are expressed as characters, strings of characters, expressions, templates, variables and/or the like.

The transform entry includes information for retrieving or otherwise obtaining from the content records 526 a transform for transforming (e.g., rearranging and/or changing the structure of) the content. This information includes a reference to the transform. The reference refers to one of a number of transforms stored in the content records 526. The content entry includes information for obtaining the content from the content records 526. This information includes a name or address assigned to or otherwise associated with the content in the content records 526. Alternatively, the information includes a reference, pointer, URI or other indicator to a location of the content in the content records 526.

The destination-location entry includes information for storing the results to the content records 526. Such information includes a name, address, reference, pointer, URI or other indicator to a location in the content records 526.

Conversion Task Example

The conversion task, as represented by the transform widget $132_{19}$, cause the host-application server 324 to (i) obtain content from the content records 526, (ii) select a conversion template from the template records 520 ("selected-conversion template"), (iii) apply the selected-conversion template to the content to convert such content, and (iv) store results therefrom in the content records 526. Examples of the conversion task parameters include a conversion-template entry, a content entry and a destination-location entry. The conversion-template, content and destination-location entries are expressed as characters, strings of characters, expressions, templates, variables and/or the like.

The conversion-template entry includes a reference to the selected-conversion template. This reference refers to any one of the conversion templates stored in the template records 520. The content entry includes information for obtaining the content from the content records 526. This information includes a name and/or an address assigned to or otherwise associated with the content in the content records 526. Alternatively, the information includes a reference, pointer, URI or other indicator to a location of the content in the content records 526.

The destination-location entry includes information for storing the results in the content records 526. This information includes a name, address, reference, pointer, URI or other indicator to a location in the content records 526.

Semantic-Protocol Task Example

The semantic-protocol task, as represented by the semantic-protocol widget $132_{20}$, includes an input and at least two outputs; and each of the outputs is/are connected to a different branch of the workflow. In operation, the semantic-protocol task cause the host-application server 324 to execute one or more of the branches of the workflow responsive to receiving or otherwise obtaining content ("input content") that matches or otherwise conforms to a given schema template.

To facilitate this, the semantic-protocol task cause the host-application server 324 to (i) select from the template records 520 a schema template ("selected-schema template"); (ii) compare the input content to some or all of the schema of the selected-schema template to determine if the input content matches or otherwise conforms to such schema; and (iii) enable or otherwise activate the output(s) of the semantic-protocol task that coincide with the determination of matches between the input content and the schema.

The semantic-protocol task parameters include a reference to the selected validation template. This reference includes a name, address, reference, pointer, URI or other indicator to a location of the validation template in the templates records 520.

Delete Task Example

The delete task, as represented by the delete widget $132_2$, causes the host-application server 324 to delete or mark for deletion one or more records and/or files stored on the memory 328. The delete task parameters include a reference to the records or files that are to be deleted or marked for deletion. This reference includes names and/or address of the records and/or files, and/or pointers, URIs or other indicators to a location of the records and/or files on the memory. The reference is/are expressed as a character, a string of characters, an expression, a variable and/or the like.

Validate Task Example

The validate task, as represented by the validate widget $132_{22}$, cause the host-application server 324 to verify that a structure (e.g., a logical structure) of a record ("evaluation record") obtained from the content records 526 conforms to the validation template specified in the validate task. Alternatively and/or additionally, the validate task causes the host-application server 324 to validate that content in the evaluation record conforms to a set of rules specified in the validate task parameters. The validate task also causes the host-application server 324 to execute one or more of the tasks as a function of an outcome of the validation. For instance, the host-application server 324 performs one or more of the tasks if the outcome of the validation indicates a successful validation. If, however, the outcome of the validation indicates an unsuccessful validation, then the host-application server 324 issues an error message indicating such unsuccessful validation.

Examples of the validate task parameters include a validation entry, a content entry and a destination-location entry. The validation, content and destination-location entries are expressed as characters, strings of characters, expressions, templates, variables and/or the like.

The validation entry includes information for retrieving or otherwise obtaining from the template records 520 the validation template and/or the validation rules. This includes, for example, names and/or addresses associated with the validation template and/or the validation rules. Alternatively, the information includes a reference, pointer, URI or other indicator to a location of the validation template and/or the validation rules in the template records 520. The validation entry also includes information for specifying one or more of the tasks for execution responsive to the outcome (e.g., success or failure) of the validation.

The content entry includes information for retrieving or otherwise obtaining the evaluation record and content therein from the content records 526. This information includes a name and/or an address assigned to or otherwise associated with the evaluation record in the content records 526. Alternatively, the information includes a reference, pointer, URI or other indicator to a location of the evaluation record in the content records 526.

The destination-location entry includes information for storing the results generated in response to executing the validation task. This information includes a name, address and/or reference, pointer, URI or other indicator to a location in the content records 526.

TCP-Listen, TCP-Get and TCP-Send Tasks Examples

The tcp-listen, tcp-get and tcp-send tasks, as represented by the tcp-listen, tcp-get and tcp-send widgets $132_{23}$-$132_{25}$ are similar to the http-listen, http-respond and http-send tasks described above, except for application of details for accomplishing differences between TCP and HTTP communication protocols (e.g., TCP typically does not have a URL parameter). Such details are known, and are not included here for simplicity of exposition.

Wait Task Example

The wait task, as represented by the wait widget $132_{26}$, causes the host-application server 324 to pause the execution of the workflow and/or one or more of the workflow branches for a given amount of time. The wait task parameters include an entry for specifying an amount of time to pause the execution. This parameter is/are expressed as a character, a string of characters, a variable, an expression and/or the like.

Get-Email Task Example

The get-email task, as represented by the get-email widget $132_{27}$, cause the host-application server 324 to retrieve or otherwise obtain an email message (with or without attachment) from the service-email server 518, via the host-email engine, and transfer the email message to the email records for subsequent retrieval. Examples of send-email task parameters include a get-email-service-definition entry. The get-email-service-definition entry is/are expressed as a character, string of characters and/or variables.

The get-email-service-definition entry includes a reference to a previously configured service definition that identifies an email service for accomplishing the get-email task. This service definition ("get-email-service definition") includes a number of parameters, which is/are stored on the memory 338 in the service-definition record 522. As an alternative, the information in or information analogous to the get-email-service definition and associated parameters ("get-email-service parameters") is/are included in the get-email task parameters instead of the service definition records 522.

The get-email-service parameters include a setting identifying service-email server 518. This setting is/are a domain of the service-email server 517, for example, and/or type of service, e.g., POP, IMAP, and other email service types. The get email-service parameters also include information for storing the email message and/or email attachments in the content records 526. This information includes a name, address and/or reference, pointer, URI or other indicator to a location in the content records 526.

Although the email-service definition and associated email-service parameters are described herein as being included in the service definition records 522, the email-service definition and the parameters included therein is/are dispensed with. If dispensed with, the get-email task parameters include information for configuring the email service.

Copy Task Example

The copy task, as represented by the copy widget $132_{28}$, causes the host-application server 324 to evaluate an expression to produce results, and transfer the results to one or more of the results records in the content records 526. The copy task also causes the host-application server 324 to create results records; and/or overwrite any of the results records in the content records 526.

Examples of the copy task parameters include an expression entry and location-destination entry. The expression definition includes an expression (e.g., a formula).

The location-destination entry includes information for storing the results in one or more of the results records. This information includes a name or address assigned to or otherwise associated with results records. Alternatively, the information for the location-destination entry includes a reference, pointer, URI or other indicator to a location in the content records 526.

Iterate Task Example

The iterate task, as represented by the copy widget $132_{29}$, cause the host-application server 324 to iterate a specified number of times one the tasks ("iterated task") using a set of content obtained from the content records 526. Alternatively, the iterate task cause the host-application server 324 to iterate the iterated task over an entire set of content obtained from the content records 526. By way of example, the iterate task cause the host-application server 324 to iterate the send-email task so as to create and transmit an email to email addresses of multiple recipients contained within the set of content (e.g., a mailing list) obtained from the content records 526. This iteration is/are performed a specified number of times or for so long as content remains in the set of content obtained from the content records 526.

Examples of the iterate task parameters include a collection entry and an iterate-flag entry. The collection and iterate-flag entries are expressed as characters, strings of characters, expressions, templates, variables and/or the like.

The collection entry includes information for retrieving or otherwise obtaining from the content records 526 the set of content for input to the iterated tasks. This information includes a name and/or an address assigned to or otherwise associated with the set of content in the content records 526. Alternatively, the information includes a reference, pointer, URI or other indicator to a location of the set of content in the content records 526.

The iterate-flag entry include information for defining a flag for indicating completion of the iterate task (e.g., no unprocessed content remains in the set of content).

Launch-Workflow Task Example

The launch-workflow task, as represented by the workflow widget $132_{30}$, causes the host-application server 324 to (i) select the recorded workflow from the recorded-workflow records 528, and (ii) trigger an execution of the recorded workflow. To trigger the execution, the launch-workflow task causes the host-application server 324 to obtain from the content records 526 the input information for the execution of the recorded workflow. In addition, the launch-workflow task causes the host-application server 324 to execute the recorded workflow in a synchronous or an asynchronous mode.

In the synchronous mode, the launch-workflow task cause the host-application server 324 to execute and complete the recorded workflow before executing another task in the workflow or in the workflow branch containing the launch-workflow task. Following the execution of the recorded workflow, the launch-workflow task cause the host-application server 324 to store in content records 526 the results from the execution of the recorded workflow as input information for another of the tasks.

In asynchronous mode, the launch-workflow task cause the host-application server 324 to execute the recorded workflow, and without waiting for completion of the recorded workflow, continue execution of other tasks of the workflow or in the workflow branch containing the launch-workflow task. The launch-workflow task might not cause the host-application server 324 to obtain the input information for another task.

Examples of the launch-workflow task's definitions include a recoded-workflow definition, recorded-workflow-input definition, a launch-workflow mode and a return-information definition. The recorded workflow and return information definitions is/are expressed as characters, strings of characters, expressions, templates, variables and/or the like.

The recorded-workflow definition includes information for retrieving or otherwise obtaining the recorded workflow from the recorded-workflow records. This information include a name or address assigned to or otherwise associated with the recorded-workflow file 528 or, alternatively, a pointer to a location of the recorded-workflow file 528 on the memory 328.

The recorded-workflow-input definition includes information for retrieving or otherwise obtaining from content records 526 the input information for the recorded-workflow input. This information include a name or address assigned to or otherwise associated with the content records 526 or, alternatively, a pointer to a location of the content records 526 on the memory 328.

The launch-workflow-mode definition includes information for designating the synchronous or asynchronous mode. The return information definition includes information for obtaining the results from the content records 526. This information include a name or address assigned to or otherwise associated with the content records 526 or, alternatively, a pointer to a location of the content records 526 on the memory 328.

Example Architecture for Triggering a Workflow Deployment and/or Execution

Figure 7:
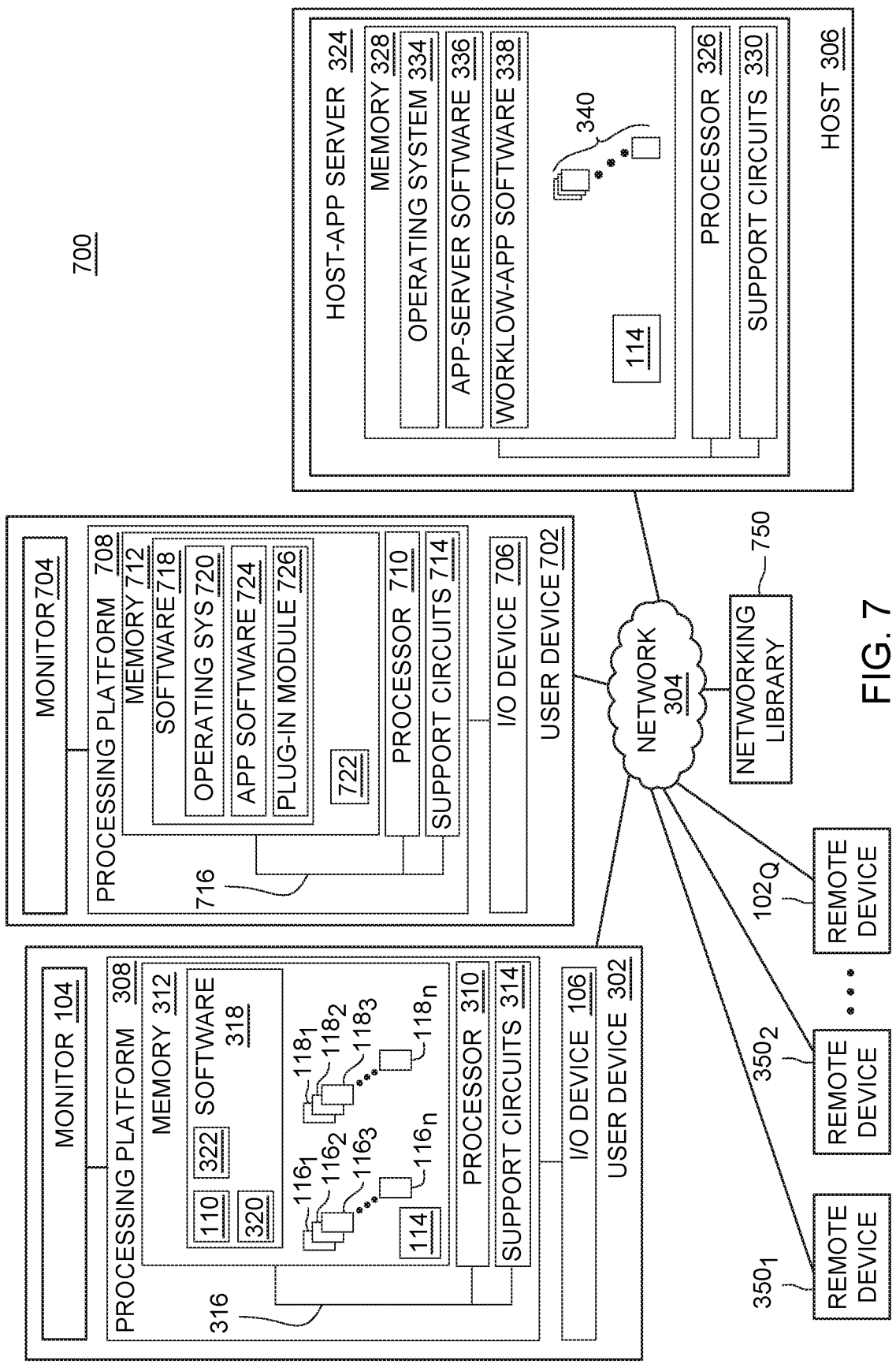
FIG. 7 is a block diagram illustrating a system for triggering a deployment and/or execution of a workflow over a network.

FIG. 7 is a block diagram illustrating a system 700 for triggering a deployment and/or execution of a workflow. The system 700 is similar to the system 300 of FIG. 3, except as described herein. The system 700 includes the user device 302, the host 306, a second user device 702, remote devices 350$_1$, 350$_2$, ... 350$_Q$ (collectively "350"), and a network setting library 750, each of which are communicatively coupled to another via the network 304.

To not obscure the following description with details and/or features of elements of the system 300 described above, some of these details and/or features are not repeated in the following description or shown in FIG. 7. Other details and/or features not described and/or not shown in FIG. 3 are presented.

The second user device 702 is similar to the user device 300 of FIG. 3, except as described herein below. The second user device 702 is/are any computing device, system and the like, and is formed in a single unitary device and concentrated on a single server, client, peer or other type node. Alternatively, the second user device 702 is formed from one or more separate devices, and as such, is distributed among a number of server, client, peer or other type nodes. In addition, the second user device 702 is scalable (i.e., employ scale-up and/or scale-out approaches).

The second user device 702 includes a large number of elements; many of which are not shown in FIG. 7 for simplicity of exposition. As shown in FIG. 7, the second user device 702 includes a second processor 710 that is operable to control, manipulate or otherwise interact with a second monitor 704 and/or a second I/O device 706, via respective couplings.

The second monitor 704 is any suitable device that displays viewable images generated by the second processing platform 708, such as listed above with respect to the second monitor 704. The second I/O device 708 is any device that accepts input from a user (man or machine) to control, manipulate or otherwise interact with the operation of the second processing platform 708, such as listed above with respect to the I/O device 706.

The second processing platform 708 includes one or more processors (collectively "second processor") 710, a second memory 712, second support circuits 714 and a second bus 716. The second processor 710 is one or more conventional processors, microprocessors, multi-core processors and/or microcontrollers. The second support circuits 714 facilitate operation of the second processor 710 and include well-known circuitry or circuits, including, for example, an I/O interface; one or more network-interface units ("NIUs"); cache; clock circuits; power supplies; and the like.

The second processor 710 uses the NIUs for exchanging content with the host 306 via the network 304. Accordingly, the NIUs are adapted for communicating over any of the terrestrial wireless, satellite, and/or wireline media.

The second memory 712 stores user-device software 718 and various other stored software packages, such as a second operating system 720. The memory 712 is, or employs, random access memory, read-only memory, optical storage, magnetic storage, removable storage, erasable programmable read only memory and variations thereof, content addressable memory and variations thereof, flash memory, disk drive storage, removable storage, any combination thereof, and the like. In addition, the memory 712 stores (and receive requests from the second processor 710 to obtain) one or more records 722, operands, operators, dimensional values, configurations, and other data that are used by the operating system 720 and the user-device software 718 to control the operation of and/or to facilitate performing the functions of the second user device 702.

The second bus 716 provides for transmissions of digital information among the second processor 710, the second memory 712, the second support circuits 714 and other portions of the second user device 702 (shown and not shown). The I/O interface is adapted to control transmissions of digital information between (shown and not shown) components of the user device 702. In addition, the I/O interface is adapted to control transmissions of digital information between I/O devices disposed within, associated with or otherwise attached to the user device 702. Examples of the I/O devices include the second I/O device 706, the second monitor 704, and any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) the like.

The second operating system 720 includes code for operating the second user device 702 and for providing a platform onto which the user-device software 718 can be executed. The user-device software 718 perform the exchange of the workflow content using communication and security protocols compatible with the second user and host devices 702, 306.

The user-device software 718 is/are in any of a standalone, client/server, peer-to-peer and other format, and includes, in a standalone or peer-to-peer format, code for accessing services offered by the host 306. Through this code, the user-device software 718 is operable to substantiate its identity, and in turn, receive authorization to obtain one or more of the services offered by the host 306 or the remote devices 350.

The user-device software 718 includes user-application software 724. The user-application software 724 includes, for example, software for one or more (or any combination) of word-processing, spreadsheet, database, email application, messaging application, text messaging interface application, presentation application, Internet-browser application, calendar application, media application, multimedia application, file management programs, operating system shells, a compiled application without a graphical user interface, a compiled programming application, a time-based job scheduler, a job scheduler application (e.g. CRON), a compiled macro-language application, a macro-language application (e.g. a Visual Basic for Applications (VBA) application for Microsoft Excel), at least one of a sensor or actuator based application deployed a device or a computer, micro-controller based application, SoC application, a MQ Telemetry Transport (MQTT) application, a WIFI based application, a mobile application, or an RTOS based application and/or other applications capable of being executed by a user device.

An MQTT application is an application using MQTT to transfer data between computers and devices. MQTT is an ISO standard (ISO/IEC PRF 2092) publish-subscribe based "light weight" messaging protocol for use on top of TCP/IP protocol, and is designed for connections with remote locations where a "small code footprint" is required or the network bandwidth is limited. Publish-subscribe messaging pattern in MQTT applications requires a message broker, which is responsible for distributing messages to interested clients based on the topic of a message. An application that runs on one of the several wireless communications, for example, WIFI, BLUETOOTH, ZIGBEE, ZWAVE, THREAD, LORA, 6LOWPAN, SIGFOX, among others. A WIFI application uses WIFI as the protocol to connect devices to the Internet. A real-time operating system (RTOS) is an operating system (OS) intended to serve real-time application process data as it comes in, typically without buffering delays. Processing time requirements (including any OS delay) are measured in tenths of seconds or shorter, and RTOS applications use RTOS to run code on different devices. A mobile application is an application running on a mobile device, for example, using a mobile device (e.g. a smartphone) as a remote control for a television, or other home appliances.

The user-application software 724 also includes software for client-side applications, such as client-side applications that interact with or access other client or remote applications (for example, a web-browser executing on the second user device 702 that interacts with a remote e-mail server to access e-mail).

A user of the second user device 702 can interact with the user-application software 724 and records 722 associated with such user-application software 724 via the various I/O devices, such as the I/O device 706. These records 722 include, for example, one or more (or any combination of) word-processor documents, spreadsheet documents, database documents, presentation documents, emails, instant-messenger messages, database entries, calendar entries, appointment entries, task manager entries, source code files, and other user application program content, files, messages, items, web pages of various formats, such as HTML, XML, extensible HTML ("XHTML"), Portable Document Format ("PDF") files, and media files, such as image files, audio files, and video files, or any other documents or items or groups of documents or items or information in electronic form suitable for storage access in the second memory 712.

The user's interaction with the records 722, user-application software 724 and/or the second user device 702 creates data ("event data") that is observed, recorded, analyzed or otherwise used, responsive to an event. Such event is any occurrence possible associated with the records 722, user-application software 724 and/or second user device 700, such as inputting text into one or more of the records 722, displaying one or more of the records 722 on the second monitor 704, sending one or more of the records 722, receiving one or more of the records 722, manipulating the I/O devices, opening one or more of the records 722, saving one or more of the records 722, printing one or more of the records 722, closing one or more of the records, opening the user-application software 724, closing the user-application software 724, idle time, processor load, disk access, memory usage, bringing the user-application software 724 to a foreground, changing visual display details of the user-application software 724 (such as resizing or minimizing), interacting with windows associated with the user-application software 724, and any other suitable occurrence associated with the records 722, user-application software 724 and/or second user device 700, whatsoever.

Additionally, event data can be generated when the second user device 700 interacts with an article independent of interaction with the user, such as when receiving an email or performing a scheduled task. Some or all of the event data is used as input information and/or used to populate, during execution of the workflow-executable code, one or more of the task parameters.

In addition, any of the user-application software 724 includes an ability to issue the execution command or otherwise trigger activation of the workflow. The user-application software 724 is also adapted to exchange with the host 306, event data, records and other content, which is used as input information and/or used to populate, during execution of the workflow-executable code, one or more of the task parameters.

Alternatively, the user-application software 724 is fitted or otherwise associated with a module 726 (e.g. a plug-in module) that adds functionality that is not native to such user-application software 724. This module 726, for example, adds to the user-application software 724, an ability to issue the execution command or otherwise trigger activation of the workflow, providing network settings required for execution of the workflow, and, issue a command to apply such network settings, for example, between the remote devices 350, and or the remote devices 350 and the host 306, before the execution of the workflow. In addition, the module 726 is adapted to exchange with the host 306 event data, records and other content, which is used as input information and/or used to populate, during execution of the workflow-executable code, one or more of the task parameters.

The module 726, when executed by the second processor 710, registers with, embed into, link to, integrate into or otherwise combine (collectively "register") with any of the user-application software 724. The module 726 is also updated or otherwise modified, including being disabled and/or removed from the user-application software 724, at any time during execution of the user-application software 724.

To facilitate the foregoing, the module 726 includes or be formed from code for adding the functionality that is not native to the user-application software 724. This code is in the form of (or any combination and/or multiple of) a plug-in, an add-on, an applet, a shared library, an extension, and the like.

The remote devices 740 are similar to remote devices of FIG. 5, and include other devices that are remote to the host-application server 324 and the user devices 302, 702. In some embodiments, one or more remote devices may provide remote services and functions, for example, services provided by AMAZON, FACEBOOK, INSTAGRAM, DROPBOX, or include configured services such as mail server, an FTP server, a file server, a database server, an HTTP server, a web server, custom web service to expose custom applications or databases, and the like, among several other such commercially available or on-site configured services. Such remote devices include devices upon which one or more tasks of a workflow are deployed and/or executed. The remote devices 350 ($350_1, 350_2, \ldots 350_Q$) are communicably coupled to each other, for example, via the network 304. The remote devices 350 may also be communicatively coupled to each other via communication channels other than the network 304, which for example, include one of the possible networks described with respect to the network 304 above. For example, two remote devices located in physical proximity communicate with each other via a local network or a peer-to-peer network, instead of the network 304.

The network setting library 750 is similar to the network setting library 341, and is implemented on a device or database (not shown separate from the network settings library 750) communicably coupled to the network 304. In some embodiments, the network settings or profiles comprising network settings are comprised in the network setting library 750.

Although the system 700, as shown, includes both the user device 302 and the second user device 702, the user device 302 and the second user device 702 is formed into a single device having functionality of both of the devices 302, 702. Alternatively, the user device 302 (or the second user device 702) is adapted to include the architecture and functionality of the second user device 702 (or the user device 302) to obviate having both of the devices 302, 702.

Figure 8:
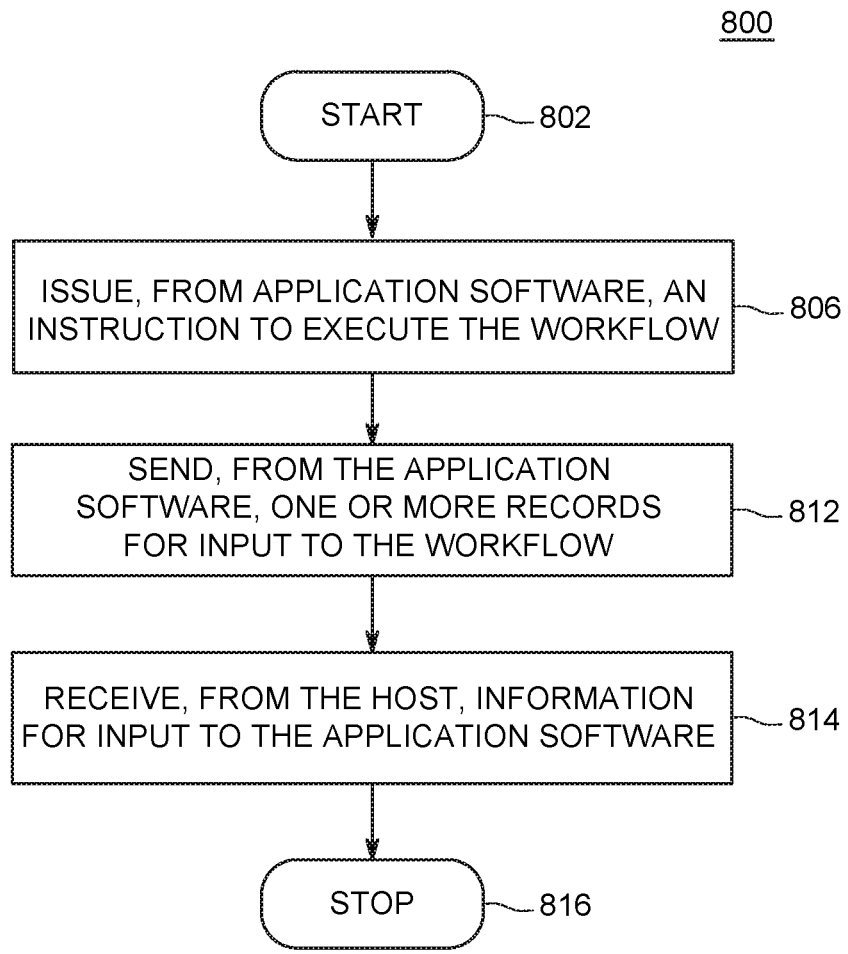
FIG. 8 is a flow diagram illustrating a flow for triggering a deployment and/or execution of a workflow over a network.

Triggering Implementation of Network Setting Configuration and a Workflow Deployment and/or Execution Referring now to FIG. 8, a flow diagram illustrating an example flow or a process or a method 800 for triggering a deployment and/or execution of a workflow is shown. For convenience, the flow 800 is described with reference to the system 700 of FIG. 7. The flow 800, however, is/are performed using other architectures as well.

The flow 800 starts at termination block 802. After termination block 802, the flow 800 transitions to process block 806.

As shown in process block 806, the second user device 702, via the user-application software 724, issues to the host 306 the execution command or other instruction to trigger activation of the workflow and/or application of network configuration settings prior to activation of the workflow (collectively "triggering instructions"). The second user device 702 does so via the application software 724 directly and/or via the module 726.

For example, the second processor 710 executes the user-application software 724 so as to enable creation of event data, and in turn, the records 722. Responsive to (user or other) interaction, the user-application software 724 issues the triggering command to the host 306 via the network 304. Alternatively, the second processor 710 executes the module 726. As such the module 726 registers with the user-application software 724 to provide the ability to issue the triggering instructions.

As an alternative to user interaction causing the issuance of the triggering instructions, the user-application software 724 and/or the module 726 is/are configured to issue the triggering instructions as a result of a condition, such as one of the events noted above. As another alternative, the user-application software 724 and/or the module 726 is/are configured to issue the triggering instructions on a periodic or continuous basis.

To facilitate flow control, the user-application software 724 and/or the module 726 forms an interrupt request and await a confirmation of completion of the execution of the workflow before resuming other activities. Alternatively, the user-application software 724 and/or the module 726 forms an interrupt request but resume other activities while awaiting confirmation of completion of the execution of the workflow. After process block 806, the flow 800 transitions to process block 812.

As discussed earlier, the host 306 applies the network settings and executes the workflow. The host 306 does so in accordance with the process blocks 411, 412 and 414 of FIG. 4.

To facilitate flow control, the host 306 signals to the user-application software 724 that the workflow is executing, completed execution and/or in another condition so as to attend to the interrupt request.

As shown in process block 812, the user-application software 724 provides, from the event data, records 722 and other content associated with the user-application software 724 and/or the module 726, information for input into the workflow during execution of the workflow. This information include task parameters, including network settings, employed for the execution of tasks. To facilitate this, the host 306 requests and receive from user-application software 724 and/or the module 726 the event data (e.g., via interaction with the user), the records 722 and/or portions thereof for use as the input information.

For example, the application software 724 is/are embodied as spreadsheet and/or database application. The module 726, as registered with the spreadsheet and/or database application, obtains the input information from specified coordinates associated with one or more cells of a spreadsheet and/or a database table. These cells include fixed numbers, variables, formulas, etc. The input information obtained from the cells is/are in the same form as the cells. Alternatively, the input information obtained from the cells is/are values resulting from application of the formulas or variables included within such cells.

The process block 810 is implemented during the execution of the workflow by the host 306, however, the process block 810 is/are implemented before execution of the workflow begins.

After the process block 812, and upon execution of the workflow, for example, by the host 306, the flow 800 transitions to process block 814. At process block 814, the user-application software 724 and/or the module 726 obtains, from the host 306, information output ("output information") from the workflow. To facilitate this, the user-application software 724 and/or the module 726 request and receive the output information from the host 306.

For example, the application software 724 is/are embodied as spreadsheet and/or database application. The module 726, as registered with the spreadsheet and/or database application, obtains the input information from specified coordinates associated with one or more cells of a spreadsheet and/or a database table. These cells include fixed numbers, variables, formulas, etc. The module 726 updates the cells with the output information obtained from the host 306.

After the process block 814, the flow 800 transitions to termination block 816, at which point the flow 800 terminates. Alternatively, the flow 800 is repeated periodically, in continuous fashion, or upon being triggered as a result of a condition, such as a command or trigger. As another alternative, the process blocks 806-810 is/are repeated periodically, in continuous fashion, or upon being triggered as a result of a condition, such as issuance of additional triggering instructions, so as to re-execute the workflow.

Figure 9:
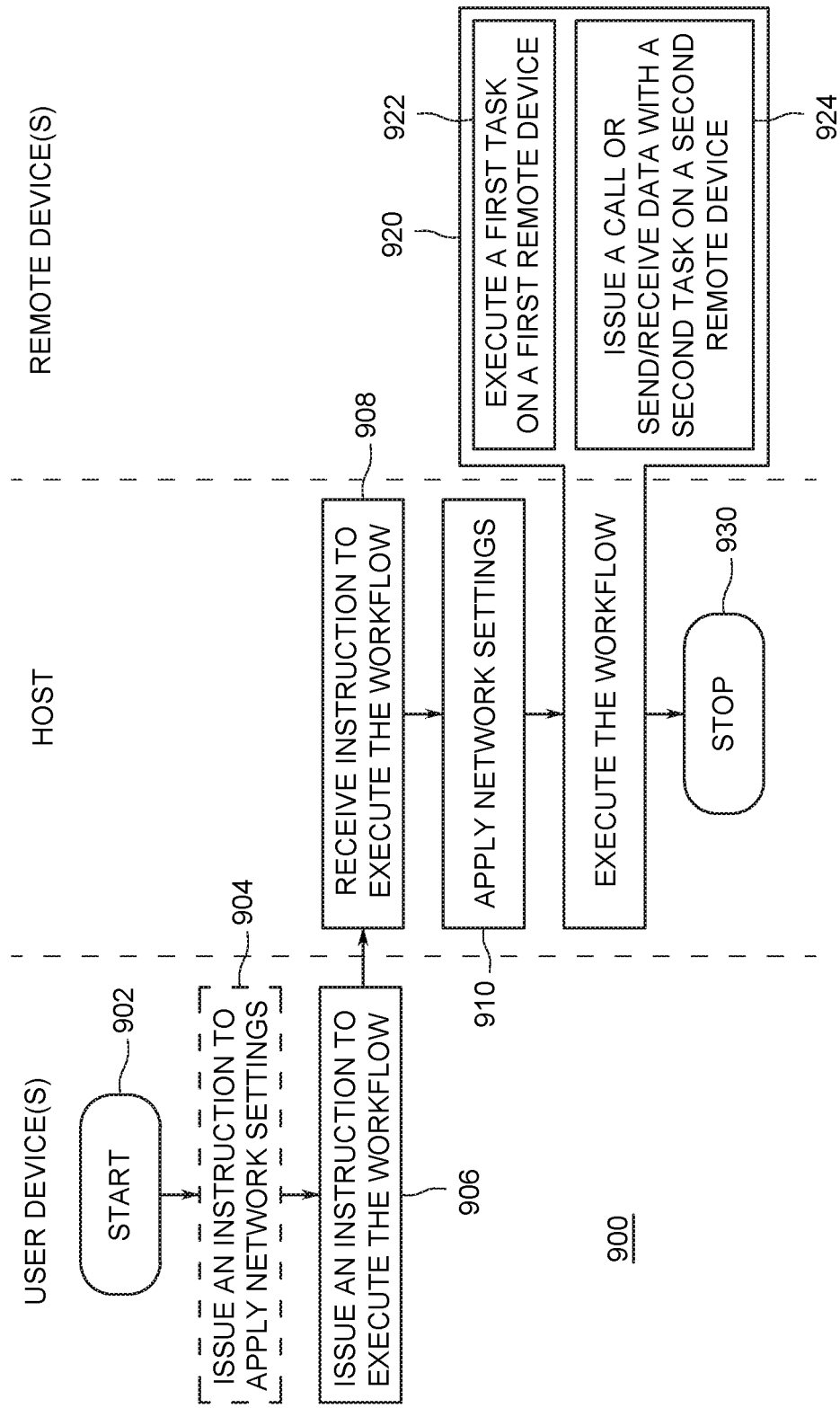
FIG. 9 is a flow for triggering a deployment and/or execution of a workflow over a network.

Workflow Deployment and/or Execution with Applied Network Configuration Settings Enabling a Connection Between Remote Devices and Tasks Referring now to FIG. 9, a flow diagram illustrating an example flow or a process or a method 900 for triggering a deployment and/or execution of a workflow is shown. For convenience, the flow 900 is described with reference to the system 700 of FIG. 7. The flow 800, however, is/are performed using other equivalent architectures as well.

The flow 900 starts at termination block 902. After termination block 902, the flow 900 transitions to optional process block 906, at which an instruction to apply network settings to remote devices. The instruction is issued from the user devices 302, 702, for example, by either the GUI software 110, or the user application software 724 and/or the module 726, respectively.

The flow 900 then transitions to process block 906 at which the flow 900 issues an instruction to execute the workflow at the host 306. The instruction is issued from the user devices 302, 702, for example, by either the GUI software 110, or the user application software 724 and/or the module 726, respectively.

The flow 900 then transitions to process block 908, at which the host 306 receives the instruction to execute the workflow, for example, according to process block 906, or according to several examples as described above.

The flow 900 then transitions to process block 910, at which the host 306 applies network settings to the remote devices for execution of the workflow. In some embodiments, if an instruction according to process block 904 is not provided, the flow 900 automatically applies network settings through the host 306 according to the process block 910, to enable connectivity between remote devices 740, for example, for execution of tasks, and for calls and data exchange between tasks. In such embodiments, the flow 900 additionally queries the network settings 750 to determine network settings for applying to the remote devices according to the workflow tasks.

The flow 900 then transitions to the process block 920, at which the host 306 executes the workflow. During execution of the workflow, the host 306 causes execution of various tasks on the remote devices 740. For example, as depicted in process block 922, a first task is executed on a first remote device, and the first task require calling additional task(s) via a remote call, exchange data with additional task(s), or initiate execution of additional task(s). The additional tasks are executed on different device(s) than the first device, although some of the additional task(s) are also executed on the first device. For example, as depicted in process block 924, the first task issues a remote call and/or sends/receives data with a second task on a second device. The issuance of a remote call and/or exchange of data between different tasks and/or remote devices is enabled by application of network settings to the remote devices. The remote call and exchange of data are conducted according to the network settings applied to the remote devices, for example, according to the process block 910, or according to other examples as described above. The workflow completes execution at the process block 920, for example, in a manner similar to that described in process block 810 of FIG. 8, or other examples discussed above.

After the process block 920, the flow 900 transitions to termination block 930, at which point the flow 900 terminates. Alternatively, the flow 900 is repeated periodically, in continuous fashion, or upon being triggered as a result of a condition, such as a command or trigger. As another alternative, the process blocks 922, 924 are repeated for multiple tasks according to the execution of the workflow.

CONCLUSION

Variations of the apparatus and method described above are possible without departing from the scope of the invention. For instance, in the examples described above, controllers and other devices containing processors are noted. These devices contain at least one Central Processing Unit ("CPU") and a memory. In accordance with the practices of persons skilled in the art of computer programming, reference to acts and symbolic representations of operations or instructions is/are performed by the various CPUs and memories. Such acts and operations or instructions are referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs support the described methods.

The data bits also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium include cooperating or interconnected computer readable medium, which exist exclusively on the processing system or are distributed among multiple interconnected processing systems that is/are local or remote to the processing system. It should be understood that the examples are not limited to the above-mentioned memories and that other platforms and memories support the described methods.

In view of the wide variety of embodiments that can be applied, it should be understood that the illustrated examples are exemplary only, and should not be taken as limiting the scope of the following claims. Further, the claims should not be read as limited to the described order or elements unless stated to that effect. In addition, use of the term "means" in any claim is intended to invoke 35 U.S.C. § 112, 6, and any claim without the word "means" is not so intended.

What is claimed is:

1. A method for triggering execution of a workflow over a network, the method comprising:
   receiving, at a host, from a user device, an instruction to execute a workflow comprising a first task for being executed on a first remote device;
   receiving, at the host, network settings from the user device to enable communication of the first task to the first remote device and execution of the first task on the first remote device;
   applying the network settings to at least one of the host or the first remote device; and
   executing the first task on the first remote device using the network settings upon receiving the instructions from the user device,
   wherein the workflow comprises a plurality of tasks for being executed on a plurality of remote devices, the plurality of tasks including the first task, and the plurality of remote devices including the first remote device, and
   wherein the network settings include settings for establishing communication between two or more of the host and the plurality of remote devices.

2. The method of claim 1, wherein the network settings include information relating to at least one of a network type, a connection mode, a connection settings, or connection parameters.

3. The method of claim 2, wherein the network type is at least one of a Public Switch Telephone Network ("PSTN"), the Internet, a proprietary public network, a wireless voice and packet-data network, 1G, 2G, 2.5G, 3G, 4G or LTE telecommunication network, a wireless office telephone system ("WOTS"), a wired or wireless local area network ("LAN"), Bluetooth network, IEEE 802.11 WLAN, a wired or wireless personal area network ("PAN"), or a wired or wireless metropolitan area network ("MAN").

4. The method of claim 2, wherein connection parameters include at least one of a login and a password, access credentials, a combination of a private and public key, Hardware type, Processor type, Network Hardware, API Key, API Secret, Connection Profile name, Type, Security Type, SSID, Password, Transport Protocol, or Device Role.

5. The method of claim 1, wherein the host generates network settings according to a status of the network configuration of at least one of the user device, the host or the plurality of remote devices.

6. The method of claim 1, wherein the instruction to execute the workflow is received from an application software on the user device, or by manipulation of the GUI software on the user device, further comprising:
receiving an instruction, from the application software on the user device or from the GUI software on the user device, to apply the network settings to at least one of the plurality of remote devices.

7. The method of claim 6, wherein the application software comprises at least one of word-processing application, spreadsheet application, database application, email application, messaging application, text messaging interface application, presentation application, Internet-browser application, calendar application, media application, multimedia application, file management programs, operating system shells, a compiled application without a graphical user interface, a compiled programming application, a time-based job scheduler, a CRON, a macro-language application, at least one of a sensor or actuator based application deployed a device or a computer, micro controller based application, SoC application, a MQTT application, a wireless communication based application, a mobile application, or an RTOS based application.

8. The method of claim 7, wherein the workflow comprises a plurality of tasks for being executed on a plurality of devices, wherein a second task of the plurality of tasks is executed on a second remote device using task parameters received from the application software on the user device.

9. The method of claim 8, wherein the task parameters received from the application software on the user device are input to the application software using the GUI on the user device, or include an output resulting from execution of the first task.

10. The method of claim 1, wherein execution of the first task on the first remote device includes placing a call by the first task to begin execution of a second task on a second remote device, or execution of the first task and the second task require exchange of data between the first task and the second task,
wherein the placing a call and the data exchange are implemented according to the network settings.

11. The method of claim 1, wherein the workflow is an ordered sequence of the plurality of tasks designed graphically using a graphical user interface (GUI) application on the user device.

12. The method of claim 1, wherein the network settings are input at the user device.

13. The method of claim 1, wherein the network settings are obtained from a database remote to the host, the user device and the remote device.

14. An apparatus for triggering execution of a workflow over a network, the apparatus comprising a host, the host comprising:
at least one processor;
a memory coupled to the at least one processor comprising instructions, which when executed using the at least one processor executes a method comprising:
receiving, from a user device, an instruction to execute a workflow comprising a first task for being executed on a first remote device;
receiving network settings from the user device to enable communication of the first task to the first remote device and execution of the first task on the first remote device;
applying the network settings to at least one of the host or the first remote device; and
executing the first task on the first remote device using the network settings upon receiving the instructions from the user device,
wherein the workflow comprises a plurality of tasks for being executed on a plurality of remote devices, the plurality of tasks including the first task, and the plurality of remote devices including the first remote device,
wherein the network settings include settings for establishing communication between two or more of the host and the plurality of remote devices.

15. The apparatus of claim 14, wherein the network settings include information relating to at least one of a network type, a connection mode, a connection settings, or connection parameters,
wherein the network type is at least one of a Public Switch Telephone Network ("PSTN"), the Internet, a proprietary public network, a wireless voice and packet-data network, 1G, 2G, 2.5G, 3G, 4G or LTE telecommunication network, a wireless office telephone system ("WOTS"), a wired or wireless local area network ("LAN"), Bluetooth network, IEEE 802.11 WLAN, a wired or wireless personal area network ("PAN"), or a wired or wireless metropolitan area network ("MAN"),
wherein connection settings includes at least one of standardized, proprietary, or open-source communication protocols, and
wherein connection parameters include at least one of a login and a password, access credentials, a combination of a private and public key, Hardware type, Processor type, Network Hardware, API Key, API Secret, Connection Profile name, Type, Security Type, SSID, Password, Transport Protocol, or Device Role.

16. The apparatus of claim 14, wherein the host receives an instruction from the user device to execute the workflow via an application software on the user device or the GUI software on the user device, and wherein the host receives an instruction to apply the network settings to at least one of the plurality of remote devices, from the application software on the user device or from the GUI software on the user device.

17. The apparatus of claim 16, wherein the application software comprises at least one of word-processing application, spreadsheet application, database application, email application, messaging application, text messaging interface application, presentation application, Internet-browser application, calendar application, media application, multimedia application, file management programs, operating system shells, a compiled application without a graphical user interface, a compiled programming application, a time-based job scheduler, a CRON, a macro-language application, at least one of a sensor or actuator based application deployed a device or a computer, micro controller based application, SoC application, a MQTT application, a wireless communication based application, a mobile application, or an RTOS based application.

18. The apparatus of claim 14, wherein execution of the first task on the first remote device includes placing a call by the first task to begin execution of a second task on a second remote device, or execution of the first task and the second task require exchange of data between the first task and the second task,
wherein the placing a call and the data exchange are implemented according to the network settings.

19. The apparatus of claim 14, wherein the network settings are input at the user device.

20. The method of claim 14, wherein the network settings are obtained from a database remote to the host, the user device and the remote device.

* * * * *